(12) United States Patent
Wu et al.

(10) Patent No.: US 10,061,085 B2
(45) Date of Patent: Aug. 28, 2018

(54) SILICON-PHOTONICS-BASED OPTICAL SWITCH

(71) Applicant: The Regents of the University of California, Oakland, CA (US)

(72) Inventors: Ming C. Wu, Moraga, CA (US); Sangyoon Han, Emeryville, CA (US); Tae Joon Seok, Berkeley, CA (US); Niels Quack, Berkeley, CA (US); Byung-Wook Yoo, Albany, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 17 days.

(21) Appl. No.: 15/109,761

(22) PCT Filed: Jan. 9, 2015

(86) PCT No.: PCT/US2015/010811
§ 371 (c)(1),
(2) Date: Jul. 5, 2016

(87) PCT Pub. No.: WO2015/147966
PCT Pub. Date: Oct. 1, 2015

(65) Prior Publication Data
US 2016/0327751 A1   Nov. 10, 2016

Related U.S. Application Data

(60) Provisional application No. 62/064,983, filed on Oct. 16, 2014, provisional application No. 61/926,276, filed on Jan. 11, 2014.

(51) Int. Cl.
*G02B 6/35* (2006.01)
*G02B 6/12* (2006.01)
(Continued)

(52) U.S. Cl.
CPC ....... *G02B 6/3502* (2013.01); *G02B 6/12007* (2013.01); *G02B 6/29344* (2013.01);
(Continued)

(58) Field of Classification Search
CPC .. G02B 6/3502; G02B 6/3508; G02B 6/3536; G02B 6/3546; G02B 6/3566; G02B 6/357; G02B 6/3584
See application file for complete search history.

(56) References Cited

U.S. PATENT DOCUMENTS 6,970,619 B2   11/2005   Baumann et al.
2002/0181855 A1 *   12/2002   Xue ................ G02B 6/3508
385/20
(Continued)

FOREIGN PATENT DOCUMENTS

| JP | 56048603 A * | 5/1981 | ........... G02B 6/3536 |
| JP | 09005799 A * | 1/1997 | ........... G02B 6/3508 |

OTHER PUBLICATIONS

Authorized Officer: Lee W. Young, "International Search Report and Written Opinion" issued in counterpart International Patent Application No. PCT/US2015/010811, dated Sep. 16, 2015, Publisher: PCT.
(Continued)

*Primary Examiner* — Michelle R Connelly
(74) *Attorney, Agent, or Firm* — Kaplan Breyer Schwarz, LLP

(57) ABSTRACT

An optical switching system comprising a switching cell having first and second fixed-position bus waveguides and a moveable shunt waveguide is disclosed. The first bus waveguide includes an input and a first output. The second bus waveguide includes a second output. When the switching cell is in its unswitched state, the shunt waveguide is not optically coupled with either bus waveguide and a light
(Continued)

signal can pass from the input to the first output while remaining in the first bus waveguide. When the switching cell is in its switched state, the shunt waveguide is optically coupled with both bus waveguides such that the light signal is coupled out of the first bus waveguide and into the second bus waveguide via the shunt waveguide. As a result, the light signal can pass from the input to the second output while bypassing the first input.

31 Claims, 19 Drawing Sheets

(51) Int. Cl.
G02B 6/293 (2006.01)
G02B 6/136 (2006.01)

(52) U.S. Cl.
CPC .............. *G02B 6/355* (2013.01); *G02B 6/357* (2013.01); *G02B 6/3546* (2013.01); *G02B 6/3584* (2013.01); *G02B 6/3588* (2013.01); *G02B 6/3596* (2013.01); *G02B 6/136* (2013.01); *G02B 6/356* (2013.01); *G02B 2006/12061* (2013.01); *G02B 2006/12097* (2013.01); *G02B 2006/12145* (2013.01); *G02B 2006/12147* (2013.01); *G02B 2006/12164* (2013.01)

(56) References Cited

U.S. PATENT DOCUMENTS

| 2003/0108274 A1* | 6/2003 | Haronian ............... G02B 6/122 |
| | | 385/17 |
| 2003/0108290 A1 | 6/2003 | Zhang et al. |
| 2007/0258681 A1 | 11/2007 | Takabayashi et al. |
| 2009/0220228 A1 | 9/2009 | Popovic |
| 2012/0105944 A1 | 5/2012 | Wang et al. |
| 2012/0170111 A1 | 7/2012 | Doerr et al. |

OTHER PUBLICATIONS

Han Wan et al., "2x2 Adiabatic 3-dB Coupler on Silicon-on-Insulator Rib Waveguides", Publisher: Department of electrical and Computer Engineering, University of British Columbia, Vancouver, Canada, Published in: CA.

Yuta Akihama et al., "Single and multiple optical switches that use freestanding silicon nanowire waveguide couplers", e16y; doi:10. 1038/ISA.2012.16, "Light: Science & Applications (2012)", Jun. 22, 2012, Publisher: CIOMP, Published in: JP.

* cited by examiner

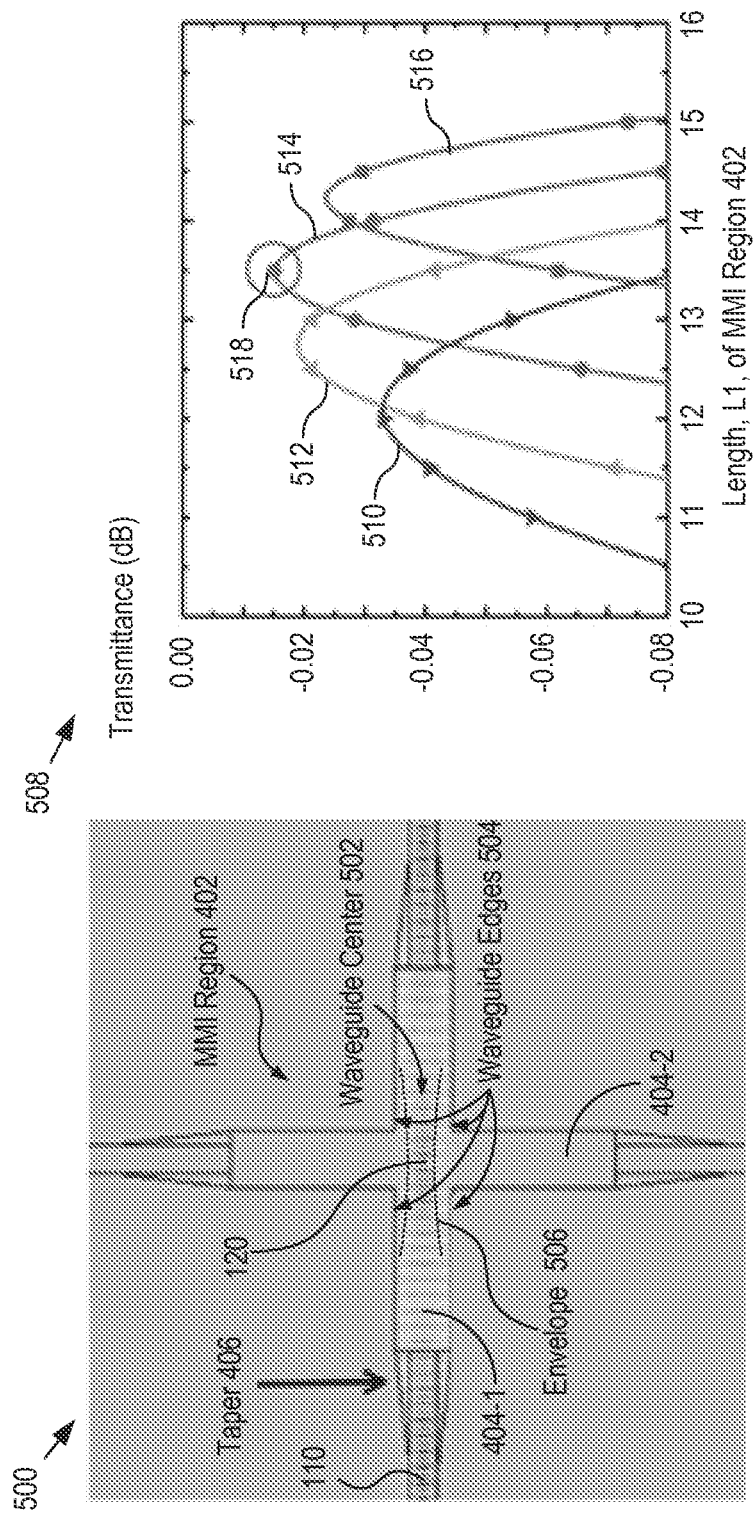

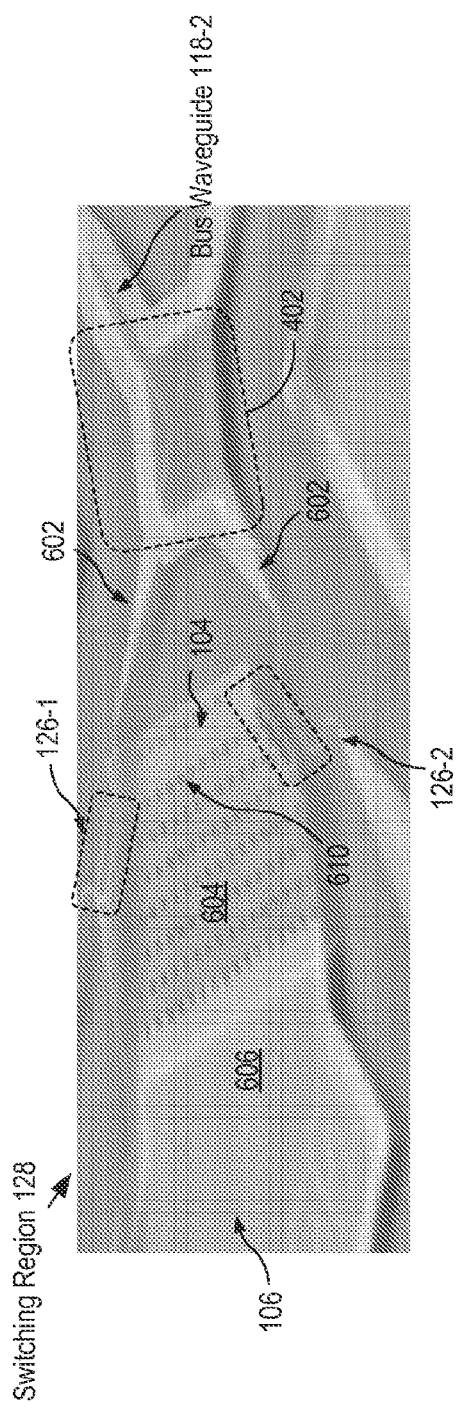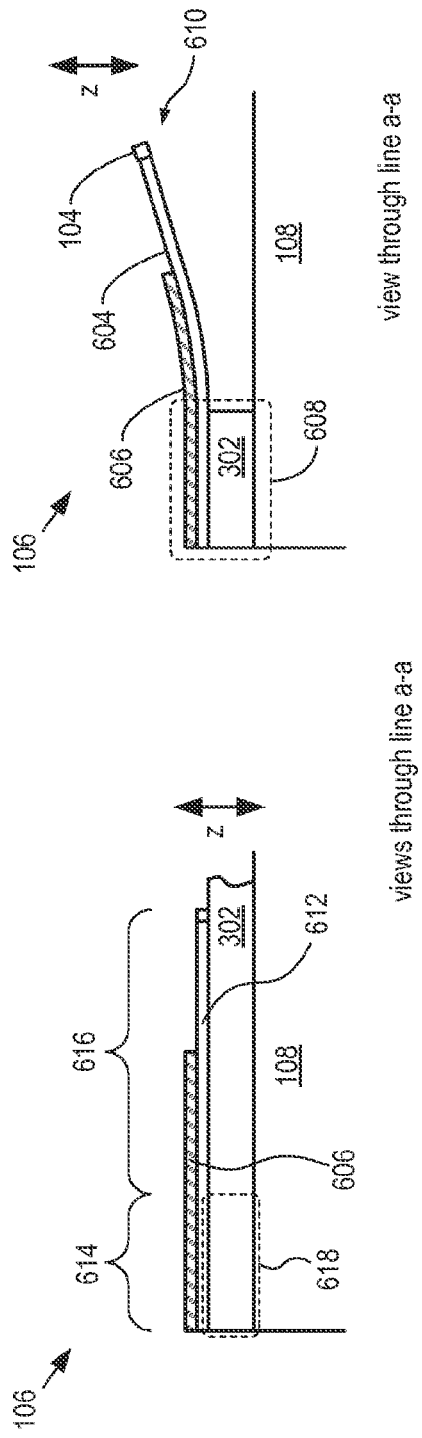
FIG. 6B
FIG. 6C
FIG. 6D

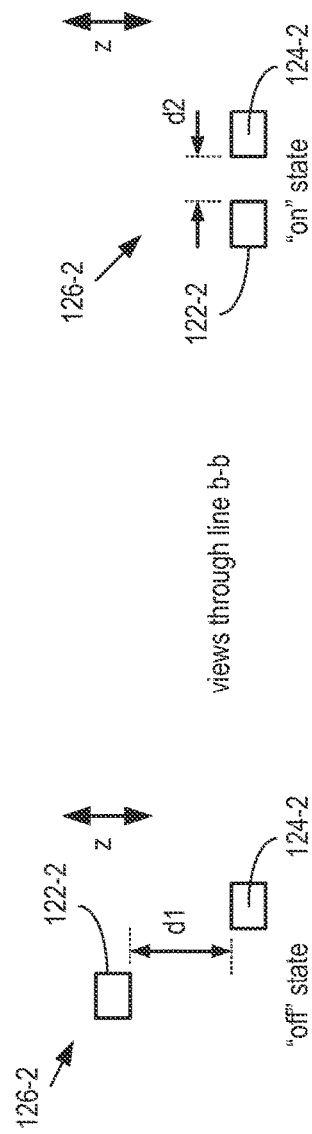
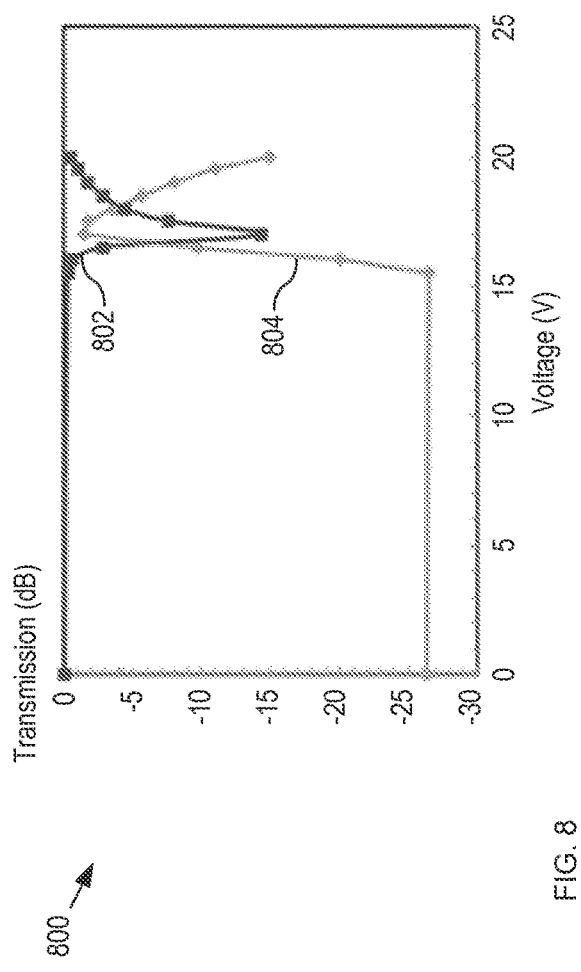
FIG. 7A
FIG. 7B
views through line b-b
FIG. 8

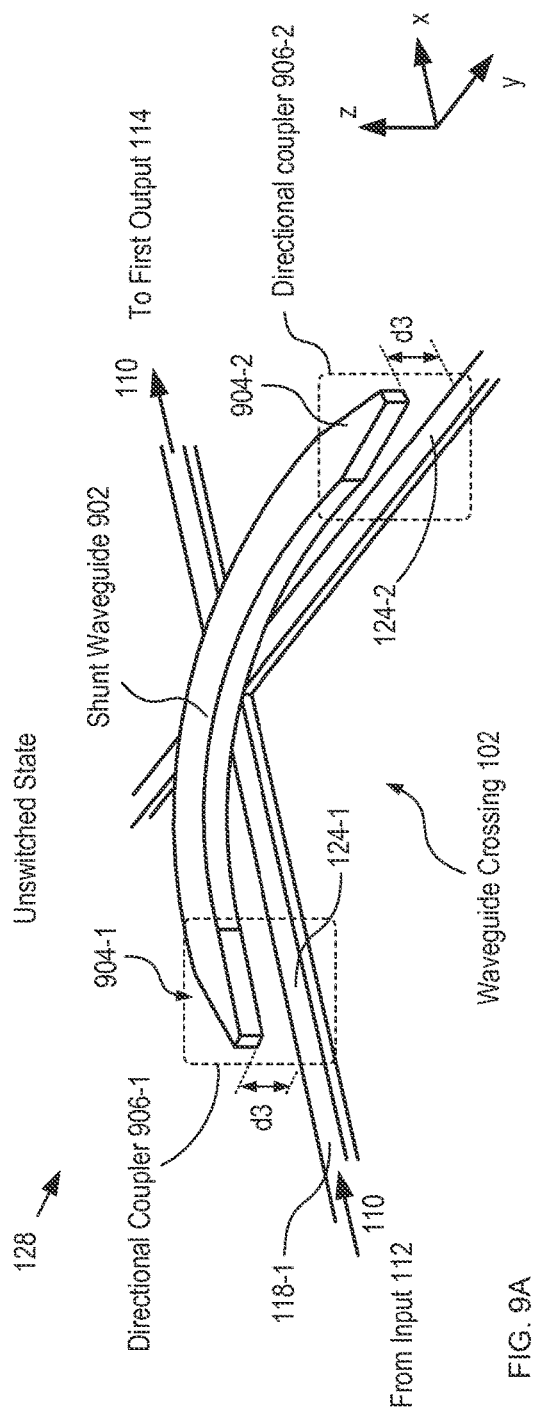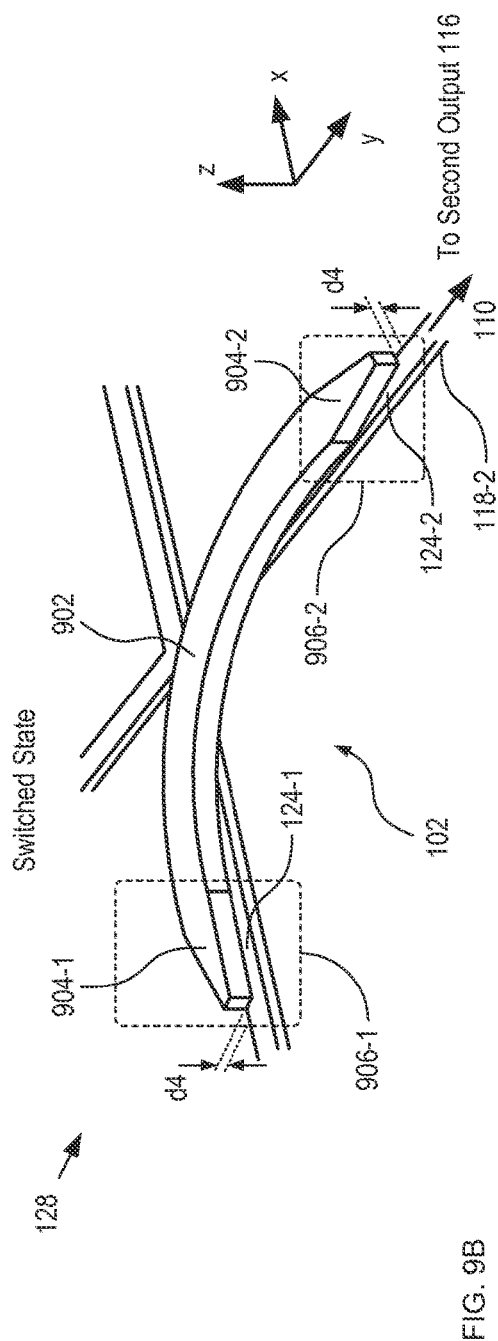
FIG. 9A
FIG. 9B

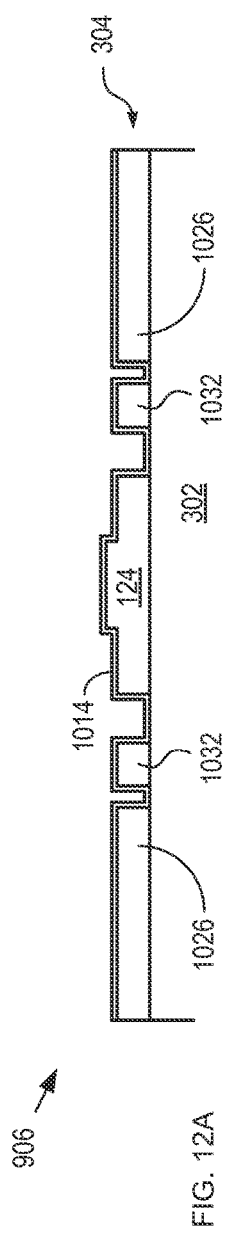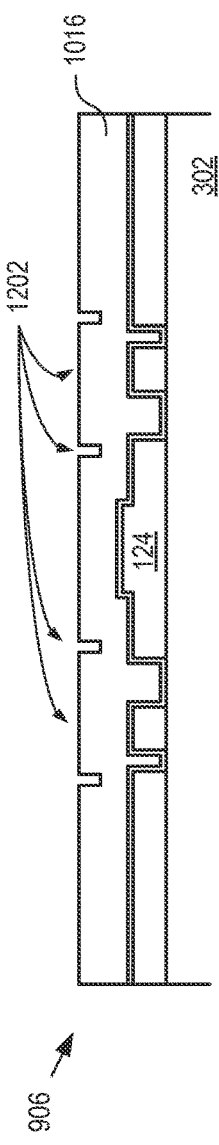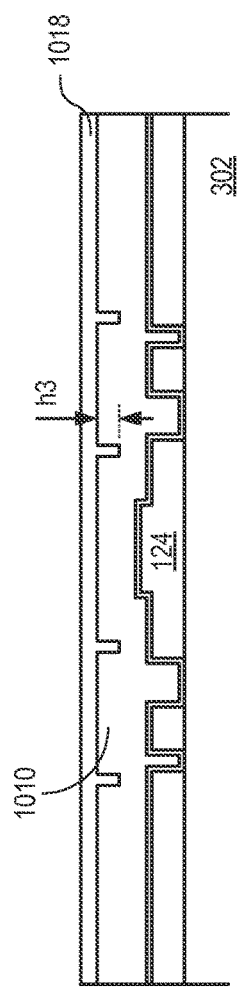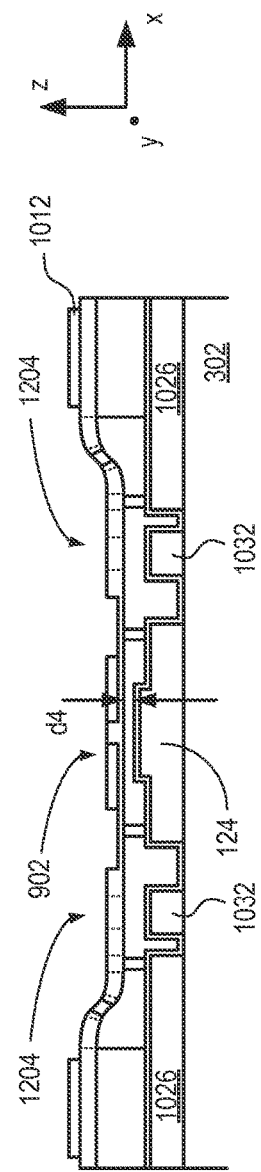

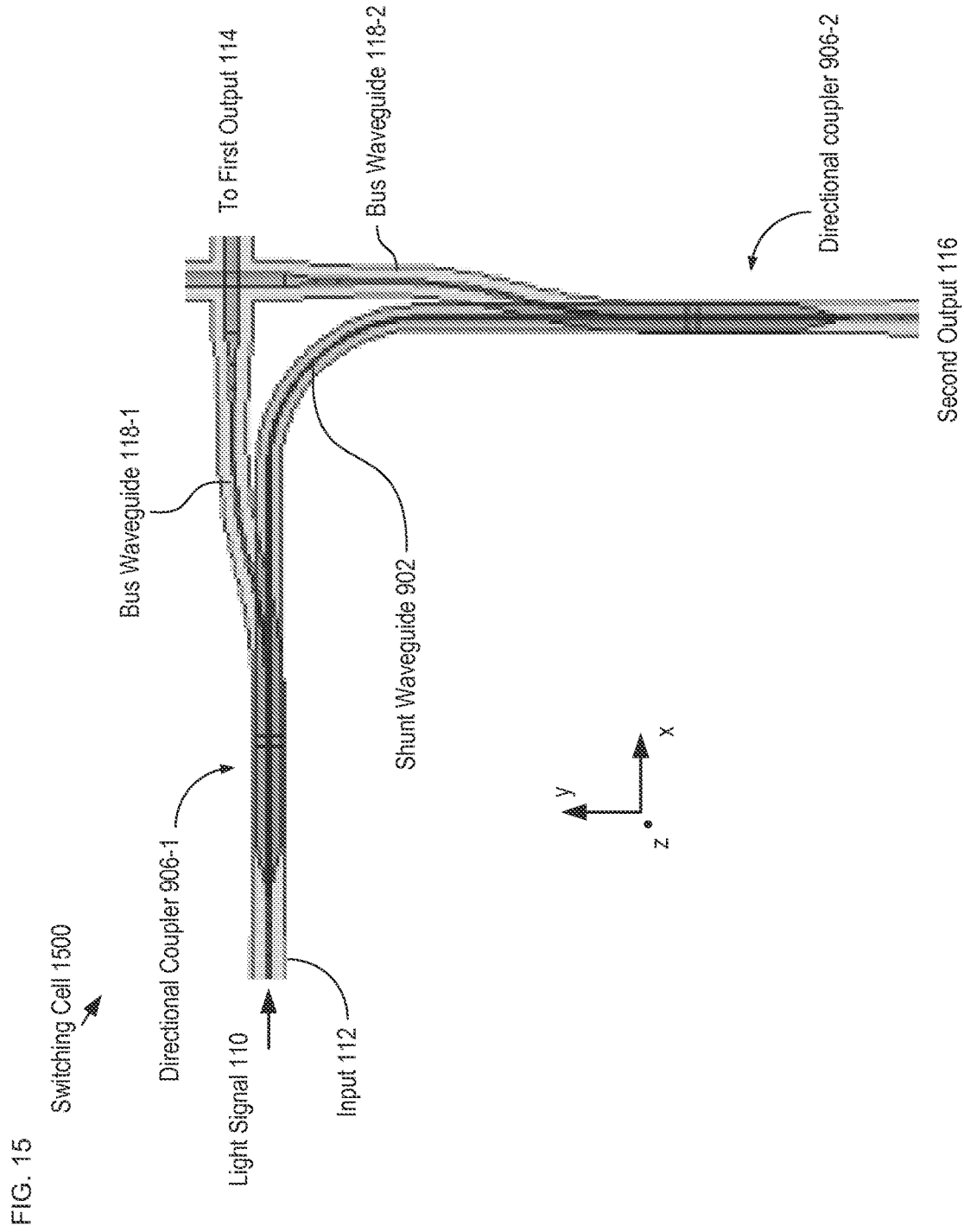

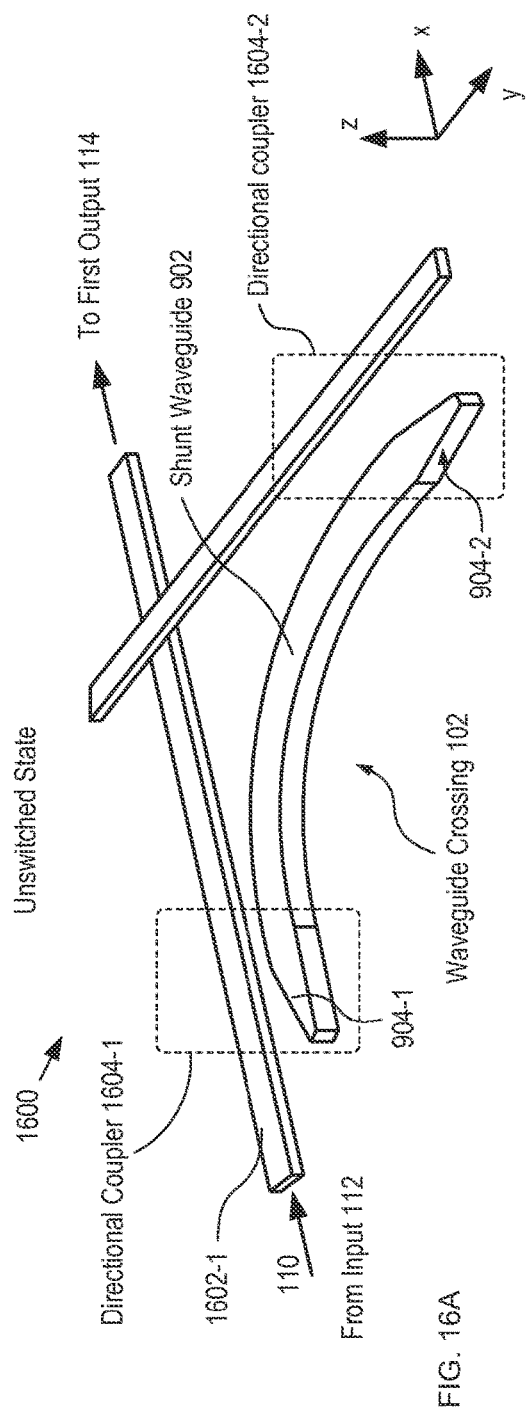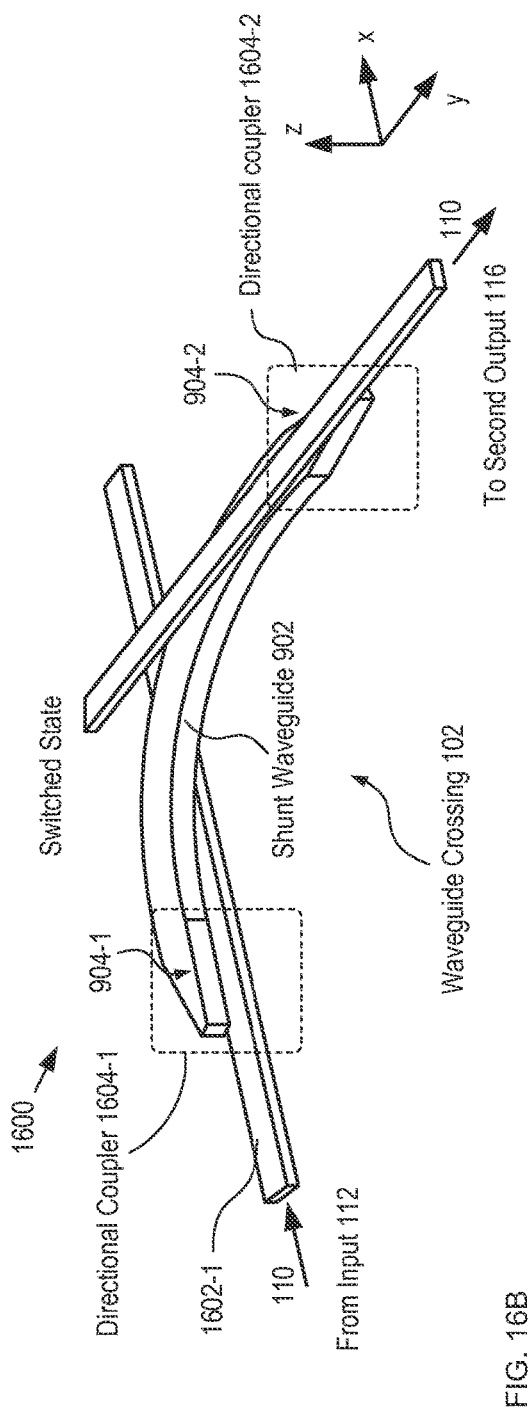
FIG. 16A
FIG. 16B

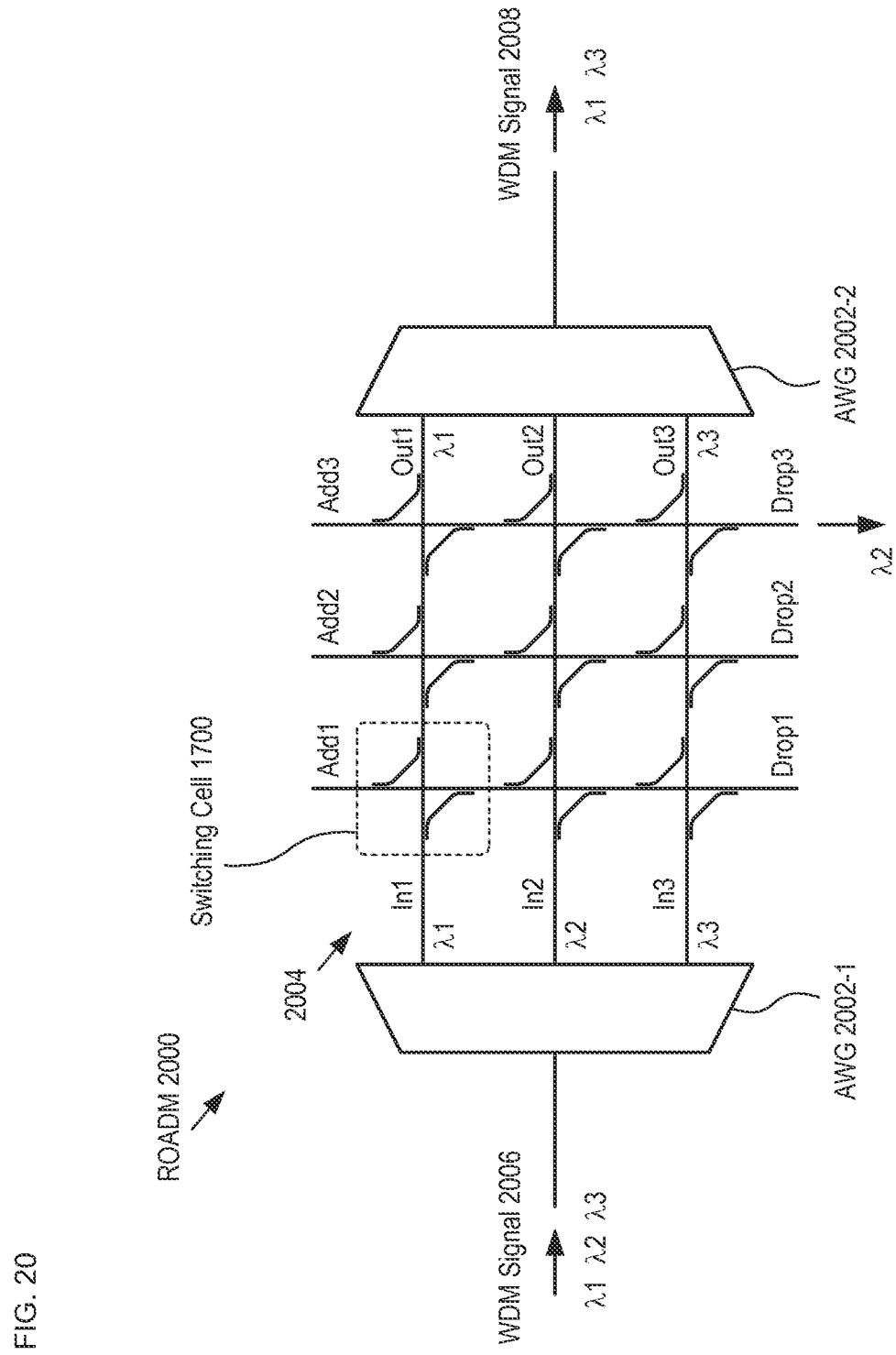

SILICON-PHOTONICS-BASED OPTICAL SWITCH

CROSS REFERENCE TO RELATED APPLICATIONS

This case claims priority of U.S. Provisional Patent Application Ser. No. 61/926,276, filed Jan. 11, 2014 and U.S. Provisional Patent Application Ser. No. 62/064,983, filed Oct. 16, 2014, each of which is incorporated by reference. If there are any contradictions or inconsistencies in language between this application and one or more of the cases that have been incorporated by reference that might affect the interpretation of the claims in this case, the claims in this case should be interpreted to be consistent with the language in this case.

STATEMENT REGARDING FEDERALLY SPONSORED RESEARCH

This invention was made with Government support under Contract No. HR0011-11-2-0021 awarded by the Defense Advanced Projects Research Agency (DARPA) and Grant No. EEC0812072 awarded by the National Science Foundation (NSF). The Government has certain rights in the invention.

FIELD OF THE INVENTION

The present invention relates to optical communications networks in general, and, more particularly, to optical switches.

BACKGROUND OF THE INVENTION

Wavelength-division multiplexing (WDM) technology has become ubiquitous in telecom and datacom networks because it provides a way to satisfy an ever-increasing demand for information bandwidth. In a WDM network, multiple individual optical signals, each carried on a different wavelength, are combined into a composite signal that can be transmitted through the optical fibers of the network with low loss. Historically, aggregate network bandwidth was increased simply by adding more wavelengths and/or transmitting the optical signals at higher data rates.

In recent decades, however, practical and technological barriers have made it increasingly difficult to increase network bandwidth in this manner. As a result, there has been a push toward agile all-optical WDM networks, which enables exploitation of previously underutilized network capacity by reconfiguring the network as bandwidth demand changes. In an optically agile WDM network, the path of an optical signal (single- or multi-wavelength) can be changed without having to convert it from the optical domain into the electrical domain and back again. Path reconfiguration is performed via one or more optical-circuit switches that redirect the photons in an optical signal as desired. The development of practical, fast, optical-circuit switches, therefore, has become a critical aspect of modern high-capacity communications networks.

Prior-art optical-circuit switches include white-light optical cross-connects (i.e., OXCs—cross connects that operate in a wavelength-independent manner), wavelength-selective cross-connects (WXCs—cross-connects whose operation is wavelength dependent), reconfigurable optical add-drop multiplexers (ROADMs—switches that can switch in or out one or more wavelength signals in a composite WDM signal), low-port count switches (e.g., cross-bar switches, 1×2 switches, etc.), and the like. The development of practical systems suitable for widespread deployment in such applications—particularly, large-port-count OXCs, has proven challenging.

Large optical switch fabrics suitable for use in white-light cross connects have been demonstrated using MEMS technology. In such switch fabrics, light beams carrying optical signals are steered from any of M input ports to any of N output ports. The light beams are directed through a three-dimensional free-space volume via opposing arrays of MEMS mirrors, each of which can be controllably tilted in two axes. Representative MEMS-based OXCs are disclosed, for example, by J. Kim, et al., in "1100×1100 port MEMS-based optical cross-connect with 4-dB maximum loss," *IEEE Photonics Technology Letters*, vol. 15, no. 11, pp. 1537-1539, Nov. 2003. The response time of such switches, however, is limited to about 10 milliseconds while faster switching speeds are required in many applications.

Silicon-core-based planar-lightwave-circuit technology (referred to herein as "silicon photonics") is seen as an attractive alternative platform to MEMS mirror arrays for high-port-count optical switches. Planar Lightwave Circuits (PLCs) are optical systems comprising one or more waveguides integrated on the surface of a substrate, wherein the waveguides can be combined to provide complex optical functionality. In silicon photonics, these "surface waveguides" include a central core of silicon (or polysilicon) that is typically surrounded by an outer cladding of a material having a refractive index that is lower than that of silicon, such as silicon dioxide, air, or a combination of both. As a result, a light signal propagating through the core is guided along the length of the waveguide by internal reflection at the interface between the silicon and silicon dioxide.

Because the difference between the refractive indices of silicon and silicon dioxide is large, the light propagating through the waveguide is tightly confined to the core material. As a result, a silicon-photonics-based PLC substrate can include a large number of densely packed surface waveguides having tight bends. Examples of silicon-photonics-based OXCs having port counts of 4×4 and 8×8 are disclosed by B. G. Lee, et al., in "Monolithic Silicon Integration of Scaled Photonic Switch Fabrics, CMOS Logic, and Device Driver Circuits," *J Lightwave Technol.*, vol. 32, no. 4, pp. 743-751, Feb. 2014 and K. Suzuki, et al., in "Ultra-compact 8×8 strictly-non-blocking Si-wire PILOSS switch," *Optics Express*, vol. 22, no. 4, p. 3887, Feb. 2014. Unfortunately, these switches comprise large numbers of cascaded 1×2 or 2×2 switches, each of which exhibits significant optical loss. For example, such N×N switch fabrics require N/2 stages of 2×2 switches. As a result, the cumulative optical loss along an optical path through the switch fabric is unacceptably high for many applications.

Another prior-art approach to silicon-photonics-based switching that has the potential to exhibit lower loss is disclosed by L. Chen, et al., in "Compact, low-loss and low-power 8×8 broadband silicon optical switch," *Optics Express*, vol. 20, no. 17, pp. 18977-18985, Aug. 2012. In this approach, which is based on a concept referred to as "switch and select," an N×N switch fabric includes 1×N switches, N×N passive interconnects, and N×2 selectors. Unfortunately, such a switch fabric still includes 2*N*N waveguides and an optical signal path through such the switch fabric encompasses 2*log 2N switches. The maximum number of crossings in the waveguide interconnect area is $(N^2-1)$. As a result, the aggregate optical loss for an optical signal propagating through the switch fabric remains quite high.

In similar fashion, an optical switch based on mechanically active silicon-photonics waveguides is disclosed by Akihama and Hane in "Single and multiple optical switches that use freestanding silicon nanowire waveguide couplers, Light: Sci. Appl., Vol. 1, published online (2012), wherein a plurality of 1×2 surface -waveguide-based optical switches are cascaded to form a 1×6 optical switch. Each optical switch includes first and second surface waveguides, the first waveguide having an input and a first output and the second waveguide having a second output. A portion of one waveguide is freestanding and movable relative to a portion of the other waveguide, where the two waveguide portions collectively define a switchable directional coupler. The movable waveguide portion is moved laterally into and out of proximity with the other waveguide by a MEMS-based lateral comb-drive actuator. When the two waveguide portions are not in close proximity, a light signal injected at the input port stays in the first waveguide and propagates to the first output. When the movable waveguide portion is brought into close proximity with the second waveguide, the light signal is coupled into the second waveguide at the directional coupler and, as a result, propagates to the second output.

Unfortunately, this approach has several drawbacks. First, the freestanding waveguide portion must be quite long. Length is needed to provide enough flexibility to the waveguide to enable its motion between its coupled and uncoupled positions, as well as to mitigate bending losses at bends in the waveguide that arise as the waveguide is moved. As a result, such an optical switch requires a great deal of chip real estate, which leads to high cost.

Second, due to the cascade arrangement of the switch, different paths through the optical switch include markedly different numbers of directional couplers. As a result, such optical switches are subject to path-dependent losses that vary considerably from path to path. Path-dependent-loss variation can lead to complicated issues in systems employing such switches. Further, the need to limit the variation of path-dependent loss can place an upper bound on the size of such systems.

A practical, fast, low-cost, low-loss optical switching technology suitable for use in switching elements of low- and high-port counts remains, as yet, unavailable in the prior art.

SUMMARY OF THE INVENTION

The present invention enables rapid, low-loss optical switching in a low-cost, practical switch technology. Embodiments of the present invention are well suited for use in telecom and datacom optical circuit switches, such as optical cross connects, wavelength-selective cross connects, reconfigurable optical add-drop multiplexers, 1×2 optical switches, and the like.

An illustrative embodiment of the present invention is an optical circuit switch that includes a switching cell having a pair of fixed-position bus waveguides and a movable shunt waveguide that can be optically coupled and decoupled with the bus waveguides. The first bus waveguide includes the input to the switch and a first output, while the second bus waveguide includes a second output. The bus waveguides cross each other at a crossing point such that, when the optical switch is in its unswitched state, the input is optically coupled with the first output and optically decoupled from the second output.

An actuator moves the shunt waveguide into and out of an optical coupling relationship with the waveguide crossing. When the actuator is in its quiescent position, the shunt waveguide is optically decoupled from the waveguide crossing and a light signal injected at the input propagates substantially unperturbed to the first output. When the actuator is in its actuated position, however, the shunt waveguide is optically coupled with the waveguide crossing and the shunt waveguide acts as an optical "shunt" that couples the light signal out of the first bus waveguide and into the second bus waveguide. As a result, the light signal is redirected to the second output via the shunt waveguide, bypassing the first output.

The illustrative embodiment includes a waveguide crossing comprising a multi-mode interference region, which serves to mitigate loss at the crossing point by concentrating more of the optical energy of the light signal near the center of the waveguide as the light signal passes through the intersection of the two bus waveguides. In some of these embodiments, the bus waveguides and the multi-mode interference region are optically coupled via tapered waveguide regions that further mitigate optical loss.

Embodiments of the invention include switching cells that are arranged to collectively define a variety of optical circuit switches, including OXCs, WXCs, ROADMs, cross-bar switches, and 1×2 switches. In some embodiments, a plurality of switching cells is arranged and operatively coupled with a diffractive element to enable adding and/or dropping of individual wavelength signals into and out of a composite WDM signal.

In some embodiments, an optical circuit switch includes one or more optical power monitors and/or one or more semiconductor optical amplifiers.

In some embodiments, an optical circuit switch includes integrated electronics. In some of these embodiments, the electronics includes circuit elements, such as CMOS devices, etc., which are monolithically integrated on the same substrate as the optical circuit switch. In some of these embodiments, the electronics includes circuit elements that are formed on a separate substrate, which is subsequently bonded to the optical circuit switch substrate, with or without an interposer.

In some embodiments, one or more switching cells are located in sealed cavities having an environment controlled to control the damping characteristics of the switching elements.

An embodiment of the present invention is an optical switching system disposed on a substrate, the optical switching system comprising a first switching cell having a first arrangement of elements that includes: a first bus waveguide that is immovable with respect to the substrate, the first bus waveguide having a first input, IP1, and a first output, OP1; a second bus waveguide that is immovable with respect to the substrate, the second bus waveguide having a second output, OP2; and a first shunt waveguide, the first shunt waveguide being movable with respect to the substrate; wherein, when the first shunt waveguide is in a first position; (1) the first shunt waveguide is optically decoupled from each of the first and second bus waveguides, and (2) IP1 is optically coupled with the OP1 and substantially optically decoupled from OP2; and wherein, when the first shunt waveguide is in a second position; (1) the first shunt waveguide is optically coupled with each of the first and second bus waveguides, and (2) IP1 is substantially optically decoupled from OP1 and optically coupled with OP2 through the first shunt waveguide.

BRIEF DESCRIPTION OF THE DRAWINGS

FIG. 5A depicts a simulation of the optical transmission through an MMI region in accordance with the present invention.

FIG. 5B depicts a plot of simulated optical transmittance through an MMI region in accordance with the present invention.

FIG. 6B depicts a scanning electron micrograph of switching region 128.

FIGS. 6C-D depict schematic drawing of cross-sectional views of actuator 106, before and after their release from substrate 108, respectively.

FIGS. 7A and 7B depict schematic drawings of a cross-sectional view of directional coupler 126-2 when actuator 106 is in its quiescent and actuated states, respectively.

FIG. 8 depicts a plot of measured switching performance for a switching cell in accordance with the illustrative embodiment.

FIGS. 9A and 9B depict schematic drawings of a simplified perspective view of switching region 900 in its unswitched and switched states, respectively, in accordance with a first alternative embodiment of the present invention.

FIGS. 12A-D depict schematic drawings of cross-sectional views of directional coupler 906 at different points in its fabrication.

FIG. 15 depicts a schematic drawing of a top view of a switching cell in accordance with a second alternative embodiment of the present invention.

FIGS. 16A-B depict schematic drawings of perspective views of a switching region in accordance with a third alternative embodiment of the present invention.

FIG. 20 depicts a schematic diagram of a reconfigurable wavelength add-drop multiplexer in accordance with the present invention.

DETAILED DESCRIPTION

The most basic embodiment of the present invention is an optical switch comprising a 1×2 switching cell. By combining multiple switching cells in a monolithic planar lightwave circuit, more complex network element embodiments, such as M×N cross-connects, data network cross-point switches, wavelength add-drop multiplexers, and the like, can be developed and such embodiments are within the scope of the present invention. In order to readily afford an understanding of many of its fundamental principles, however, the description of the present invention begins with a simple 1×2 switching cell embodiment.

1×2 Switching Cell

Figure 1A:
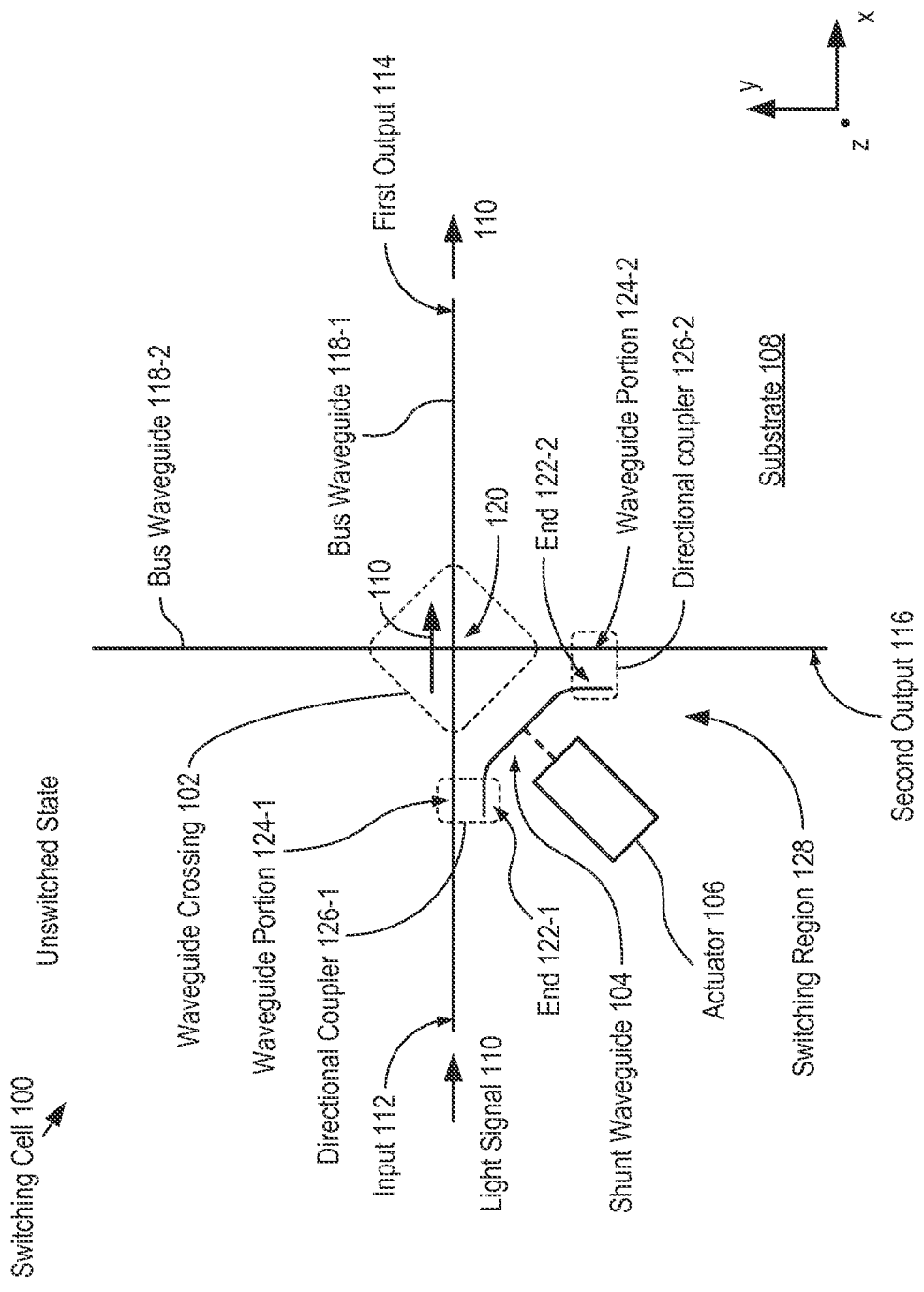
FIGS. 1A and 1B depict schematic drawings of a 1×2 optical switching cell, in its unswitched and switched states, respectively, in accordance with an illustrative embodiment of the present invention.
Figure 1B:
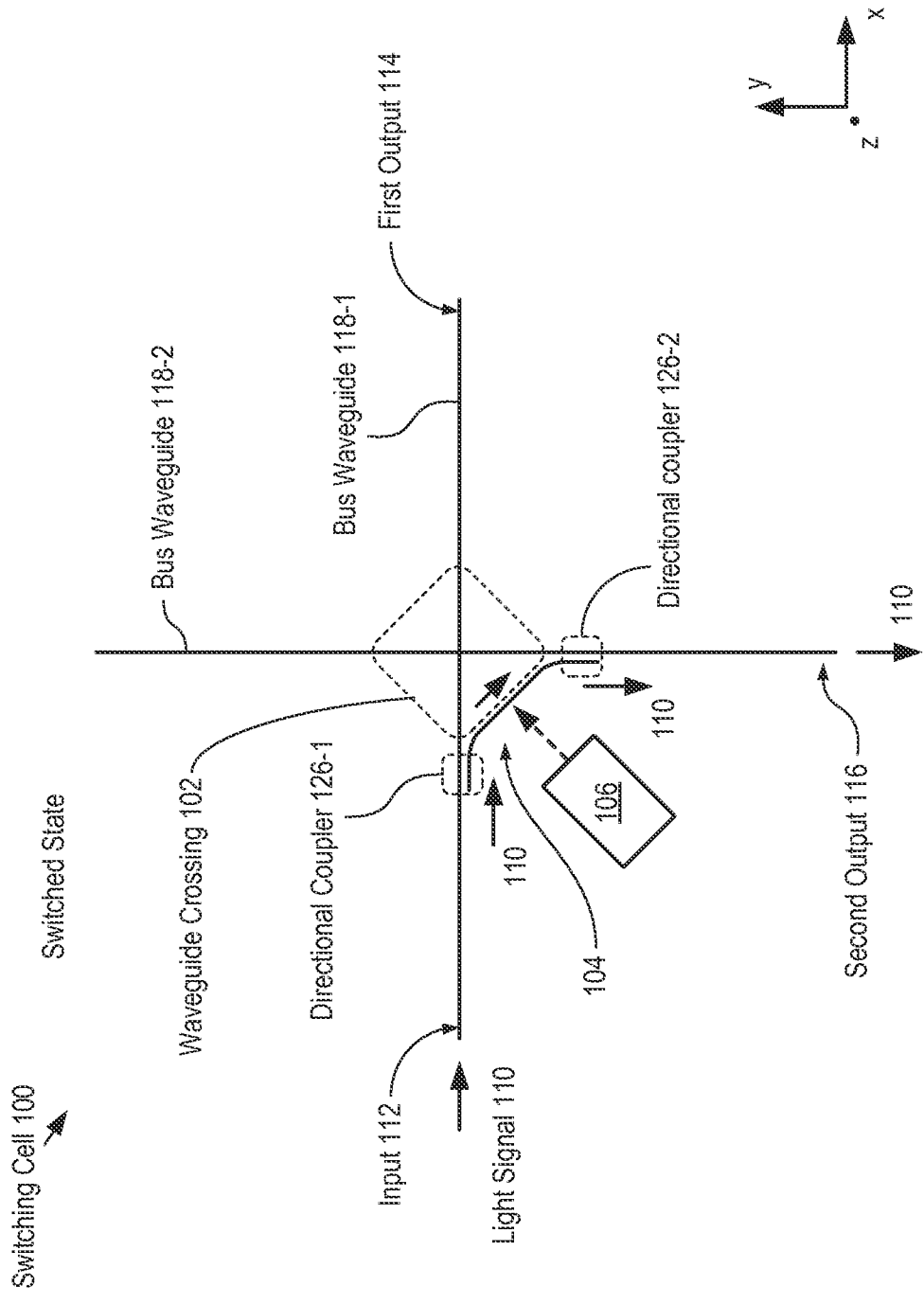

FIGS. 1A and 1B depict schematic drawings of a 1×2 optical switching cell, in its unswitched and switched states, respectively, in accordance with an illustrative embodiment of the present invention. FIGS. 1A and 1B are simplified to facilitate demonstration of the operation of the switching cell. Switching cell 100 is a 1×2 optical circuit switch that includes waveguide crossing 102, shunt waveguide 104, and actuator 106, each of which is disposed on common substrate 108. For the purposes of this Specification, including the appended claims, the term "disposed on" is defined as "exists on or above" an underlying material or layer. This layer may comprise intermediate layers, such as transitional layers, necessary to ensure a suitable surface. For example, if a material is described to be "disposed (or grown) on a substrate," this can mean that at least a portion of the material is either (1) in intimate contact with the substrate; (2) in contact with one or more transitional layers that reside on the substrate; or (3) mechanically connected to material or an element that resides on the substrate.

Waveguide crossing 102 and shunt waveguide 104 collectively define switching region 128. In operation, the state of switching cell 100 determines whether light signal 110, injected at input 112, is received at first output 114 or second output 116.

Waveguide crossing 102 includes bus waveguides 118-1 and 118-2 (referred to, collectively, as bus waveguides 118), which are arranged such that they cross at crossing point 120. Preferably, the bus waveguides are substantially orthogonal to one another so that little or no light propagating through bus waveguide 118-1 leaks into bus waveguide 118-2 at crossing point 120 when switching cell 100 is in its quiescent state. In some embodiments, however, bus waveguides 118-1 and 118-2 form an angle other than 90°.

Shunt waveguide 104 is a silicon-photonics waveguide comprising ends 122-1 and 122-2 (referred to, collectively, as ends 122). Shunt waveguide 104 is movable relative to waveguide crossing 102 and is operatively coupled with actuator 106.

In the illustrative embodiment, each of shunt waveguide 104 and bus waveguides 118 is a silicon-photonics waveguide. It will be clear to one skilled in the art after reading this Specification, however, how to specify, make, and use alternative embodiments wherein at least one of shunt waveguide 104 and bus waveguides 118 is a waveguide other than a silicon-photonics waveguide.

Actuator 106 is an electrostatic actuator that is mechanically coupled with shunt waveguide 104 such that the actuator controls the position of ends 122 relative to bus waveguides 118. As discussed below and with respect to FIGS. 5A-C, in the illustrative embodiment, actuator 106 is a vertical electrostatic actuator that controls the height of shunt waveguide 104 above substrate 108. For clarity, the vertical separation between ends 122 and bus waveguides 118 is represented as a lateral separation in FIGS. 1A-B. Although the illustrative embodiment comprises a vertical electrostatic actuator, it will be clear to one skilled in the art, after reading this Specification, how to specify, make, and use any actuator suitable for controlling the separation between ends 122 and bus waveguides 118. Actuators suitable for use in the present invention include, without limitation, vertical actuators, lateral actuators, and actuators that actuate both vertically and laterally. Further, actuators in accordance with the present invention include, without limitation, electrothermal, thermal, magnetic, electromagnetic, electrostatic comb-drive, magnetostrictive, piezoelectric, fluidic, pneumatic actuators, and the like.

End 122-1 and waveguide portion 124-1 of bus waveguide 118-1 collectively define directional coupler 126-1. In similar fashion, end 122-2 and waveguide portion 124-2 of bus waveguide 118-2 collectively define directional coupler 126-2. Directional couplers 126-1 and 126-2 (referred to, collectively, as directional couplers 126) are MEMS-based optical elements that can be mechanically switched between an "off" set and an "on" state by changing the separation between each of ends 122 and its respective bus waveguide 118.

When switching cell 100 is in its unswitched state, actuator 106 is in its quiescent state, in which it holds shunt waveguide 104 at a first position in which the shunt waveguide is well above the height of waveguide crossing 102. As a result, ends 122-1 and 122-2 are separated from waveguide portions 124-1 and 124-2, respectively, by quiescent distance d1. Quiescent distance d1 is sufficient to ensure that substantially no optical energy transfers between ends 122 and their respective waveguide portions (i.e., directional couplers 126-1 and 126-2 are in their "off" state) and light signal 110 propagates, substantially unperturbed, through bus waveguide 118-1 from input 112 to first output 114. For the purposes of this Specification, including the appended claims, the "off" state of a directional coupler is defined as a state in which substantially no optical energy transfers between its elements.

To put switching cell 100 in its switched state, actuator 106 moves to its actuated position, in which it holds shunt waveguide 104 at a second position in which the shunt waveguide is in close proximity to waveguide crossing 102. In the second position, ends 122-1 and 122-2 are separated from waveguide portions 124-1 and 124-2, respectively, by coupling distance, d2. Coupling distance d2 small enough to enable substantially all of the optical energy of light signal 110 to transfer from waveguide portion 124-1 into end 122-1, and from end 122-2 into waveguide portion 124-2 (i.e., each of directional couplers 126-1 and 126-2 is in its "on" state). For the purposes of this Specification, including the appended claims, the "on" state of a directional coupler is defined as a state in which the transfer of optical energy between its elements is enabled. As a result, light signal 110 couples into shunt waveguide 104 at directional coupler 126-1, propagates through shunt waveguide 104 to directional coupler 126-2, and couples into bus waveguide 118-2. When switching cell 100 is in its switched state, therefore, light signal 110 is redirected to second output 116.

In many applications, such as a large-port-count optical cross-connects, it is important that optical loss through switching cell 100 is very low. There are several sources of such loss, including: (1) propagation losses in bus waveguides 118; and (2) loss at waveguide crossing 102. Further, in many applications, it is important that a cross-connect exhibit very little path-dependent-loss (i.e., each path through the network is characterized by approximately the same loss).

Propagation loss in a surface waveguide arises, in large part, to sidewall roughness that develops during the etching operations used to define the waveguide structure. Propagation loss due to sidewall roughness decreases rapidly with increasing waveguide width, however. Some embodiments of the present invention, therefore, include bus waveguides whose widths are wide enough to avoid large sidewall-roughness effects while still maintaining single-mode behavior for light signal 110. Further, ridge waveguides, rather than rib waveguides, are preferable for bus waveguides 118 and shunt waveguide 104 because ridge waveguides typically have lower loss. In addition, in some embodiments, wider waveguides that support multimode operation are used in straight sections of the waveguides to further reduce optical scattering loss. Typically, in such embodiments, the waveguide width is tapered back to a width that supports single-mode operation prior to switching region 128 to avoid excitation of high-order modes in switching cell 100.

Figure 2:
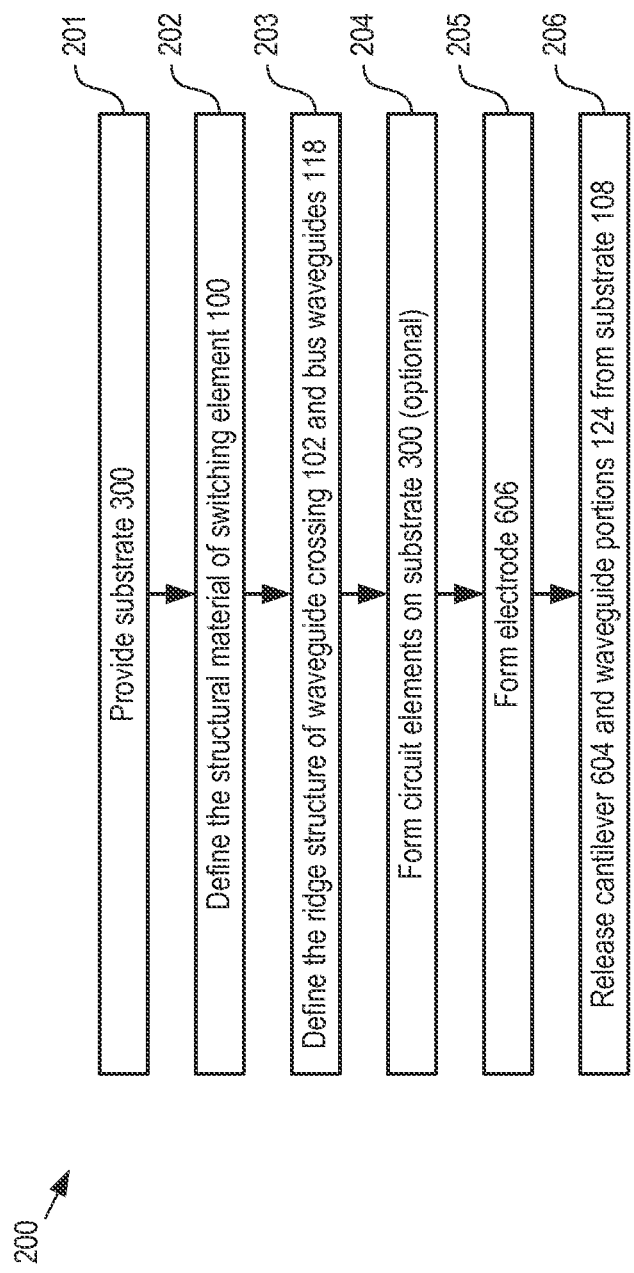
FIG. 2 depicts operations of a method suitable for fabricating a switching cell in accordance with the illustrative embodiment of the present invention.

FIG. 2 depicts operations of a method suitable for fabricating a switching cell in accordance with the illustrative embodiment of the present invention. Method 200 begins with operation 201, wherein substrate 300 is provided. Method 200 is described with continuing reference to FIGS. 1A-B, as well as reference to FIGS. 3-7.

Figure 3:
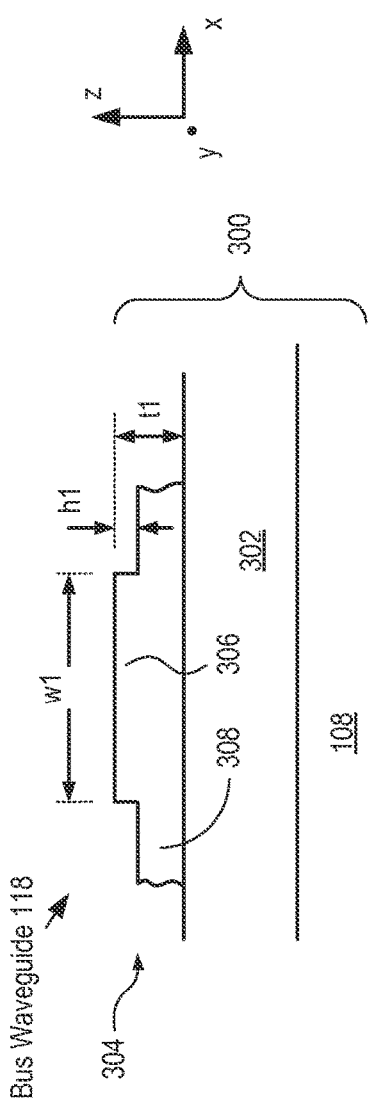
FIG. 3 depicts a schematic drawing of a cross-sectional view of a bus waveguide in accordance with the illustrative embodiment.

FIG. 3 depicts a schematic drawing of a cross-sectional view of a bus waveguide in accordance with the illustrative embodiment. Bus waveguide 118 includes ridge 306 and slab region 308, whose dimensions support single-mode propagation of light signal 110. Bus waveguide 118 is representative of each of bus waveguides 118-1 and 118-2.

Substrate 300 is a conventional SOI substrate that includes handle substrate 108, buried oxide (BOX) layer 302, and active layer 304. In some embodiments, substrate 300 includes one or more integrated-circuit devices and/or circuits.

Buried oxide layer 302 is a layer of silicon dioxide having a thickness of approximately 3 microns. Active layer 304 is a layer of single-crystal silicon having a thickness, t1, of approximately 220 nanometers (nm). One skilled in the art will recognize that these thicknesses for BOX layer 302 and active layer 304 are merely exemplary and that either of these layers can have a different thickness.

At operation 202, active layer 304 is patterned to define the structural material of switching cell 100 (i.e., waveguide crossing 102, shunt waveguide 104, actuator 106, and bus waveguides 118). Typically, active layer 304 is patterned via conventional lithography (e.g., photolithography, x-ray lithography, e-beam lithography, etc.) and a suitable conventional etching process, such as reactive-ion etching (RIE) or deep reactive-ion etching (DRIE), which etches completely through active layer 304.

At operation 203, waveguide crossing 102 and each of bus waveguides 118 is patterned to define a ridge-waveguide structure. The ridge-waveguide structure is formed via a second lithography and etching process, wherein the etch depth is controlled to realize the desired ridge height.

Ridge 306 has a width, w1, of approximately 600 nm and a height h1, of approximately 60 nm. It should be noted that, for the purposes of this Specification, including the appended claims, the stated width of a ridge waveguide is referred to by the width of its ridge portion.

Slab region 308 has a thickness of approximately 160 nm and is sufficiently wide so the optical energy is effectively confined in or near the ridge area. Typical the width of the slab region is several microns, although it can be much wider.

Bus waveguide 118 is disposed on BOX layer 302, which functions as a lower cladding for the waveguide.

One skilled in the art will recognize that these dimensions for bus waveguides 118 are merely exemplary and that many suitable designs for the ridge-waveguide structure of the waveguides are within the scope of the present invention. In some embodiments, at least one of bus waveguides 118 has waveguide structure other than a ridge structure, such as a rib structure, box structure, etc.

Low optical loss at crossing point 120 is vital for embodiments in which a light signal transits multiple crossing points, such as in a high-port-count OXC, an add-drop multiplexer, and the like. As a result, switching cell 100 includes a waveguide crossing that mitigates optical loss at crossing point 120.

Figure 4:
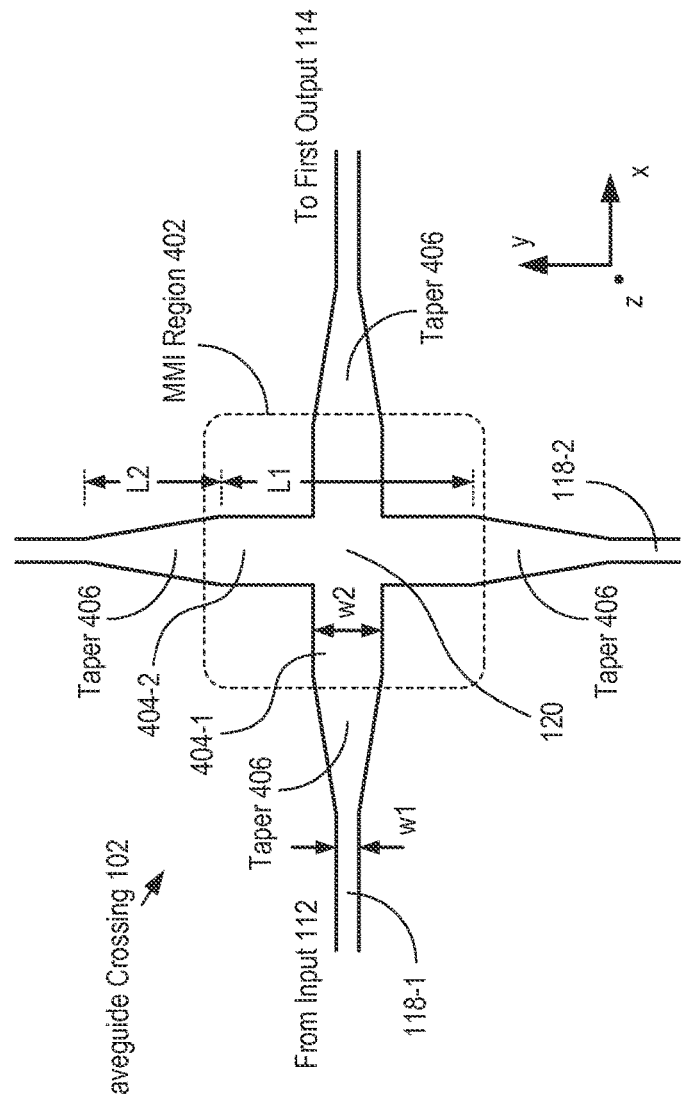
FIG. 4 depicts a schematic drawing of a low-loss waveguide crossing in accordance with the present invention.

FIG. 4 depicts a schematic drawing of a low-loss waveguide crossing in accordance with the present invention. Waveguide crossing 102 includes multi-mode interference region 402 and tapers 406.

As discussed above, outside of multi-mode-interference (MMI) region 402, the width, w1, of bus waveguides 118 is 600 nm. Inside MMI region 402, however, the width, w2, of the bus waveguides is wider, which enables multi-mode interference to occur in waveguide portions 404-1 and 404-2.

FIG. 5A depicts a simulation of the optical transmission through an MMI region in accordance with the present invention. Plot 500 shows simulated optical transmission through MMI region 402, where the optical energy in light signal 110 is simulated using FDTD (finite difference time domain) method. It should be noted that the simulation is based on a structure in which both the waveguide and the MMI section are of ridge waveguide structure (i.e., slab region 308 is etched only partially through the thickness of layer 304).

As light signal 110 propagates through waveguide portion 404-1, the expanded width of the waveguide portion gives rise to multi-mode interference that focuses the optical energy of the light signal toward the center of the waveguide portion as it propagates past center point 120, thereby reducing the amount of optical energy near waveguide edges 504 (indicated by optical-energy envelope 506). In other words, MMI region 402 concentrates more of the optical energy of the light signal toward the center of the waveguide near center point 120 (i.e., within waveguide center 502). This leaves less of its optical energy near the edges of the bus waveguide at the intersection between bus waveguides 118-1 and 118-2, where structural discontinuities can give rise to scattering, etc. For example, when switching cell 100 is in its unswitched state, the optical energy of light signal 110 is focused near the center of waveguide portion 404-1 and away from its sides. It should be noted that, although more of the optical energy of light signal 110 is concentrated near waveguide center 502, some of the optical energy still remains near waveguide edges 504 but can be substantially neglected.

By virtue of the concentration of the optical energy of light signal 110 in waveguide center 502, scattering loss, as well as other losses, are reduced at the waveguide discontinuities near crossing point 120, where waveguide portions 404-1 and 404-2 meet. In the illustrative embodiment w2 is approximately 2 microns and L1 is approximately 13.5 microns; however, one skilled in the art will recognize that other values of w2 and L1 are within the scope of the present invention.

In order to enable adiabatic conversion of the optical mode of light signal 110 between single mode and multi-mode, a taper 406 is included at each interface between a bus waveguide 118 and a waveguide portion 404. Each of tapers 406 has a width that changes linearly over its length, L2, which is equal to 3.5 microns. In some embodiments, the width of the slab region of bus waveguides 118 is also tapered along the length of tapers 406. Waveguide crossings having crossing loss as low as approximately 0.01 dB and crosstalk less than −50 dB have been demonstrated.

It should be noted that the dimensions provided here for bus waveguides 118, waveguide portions 404, and tapers 406 are merely exemplary and that many alternative designs are possible within the scope of the present invention.

FIG. 5B depicts a plot of simulated optical transmittance through an MMI region in accordance with the present invention. Plot 508 shows transmittance as a function the length, L1, of MMI region 402 for different taper lengths, L2, derived using the finite-difference time domain (FDTD) method. Traces 510, 512, 514, and 516 correspond to taper lengths of 4.5, 4.0, 3.5, and 3.0 microns, respectively.

Point 518 indicates the lowest transmission loss (approximately 0.017 dB/crossing) for waveguide crossing 102, which is obtained for L1 equal to approximately 13.5 micrometers and L2 equal to approximately 3.5 micrometer. It should be noted that these dimensions depend on the waveguide design (e.g., w1, h1, t1), as well as the width of slab 308.

Figure 6A:
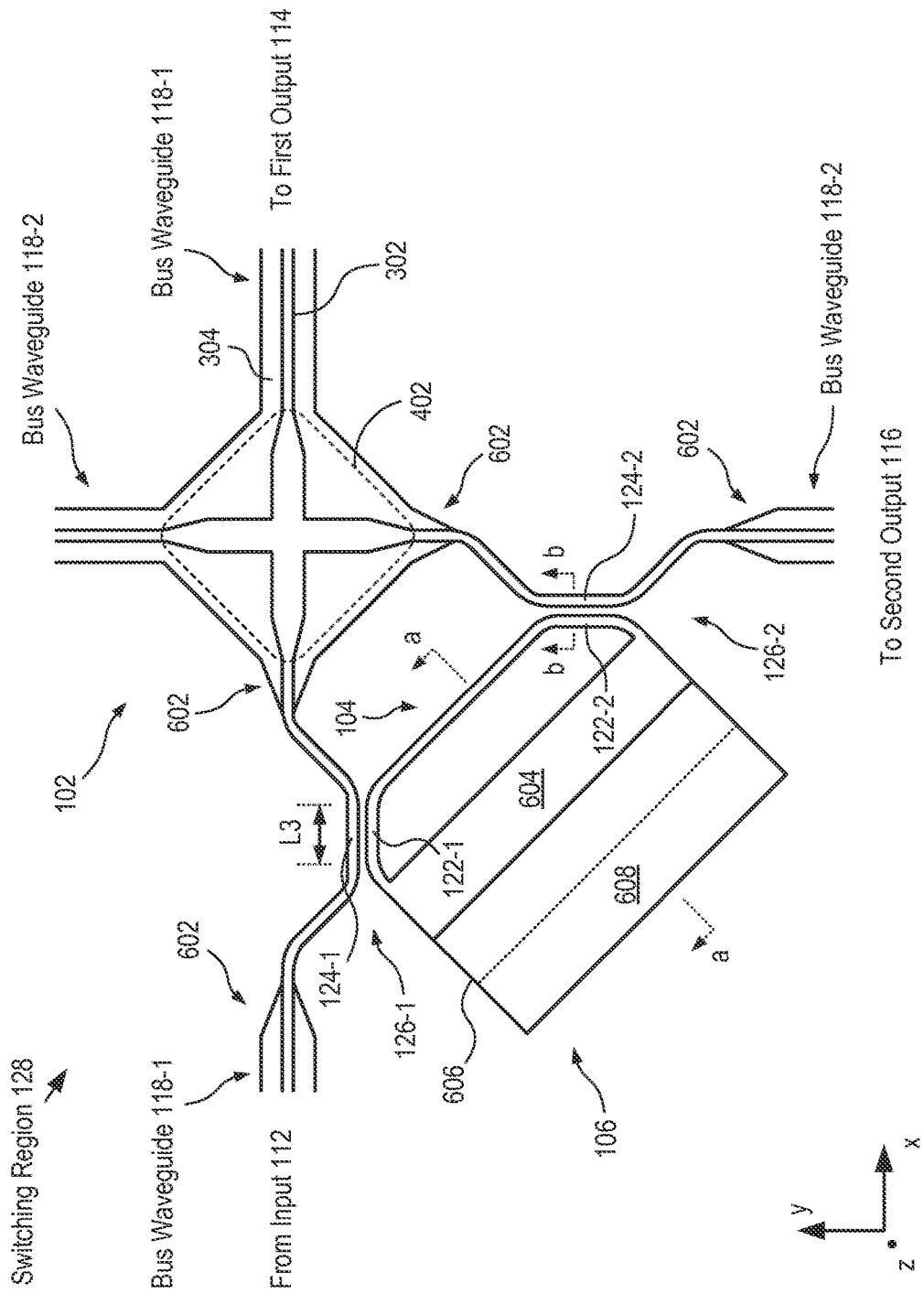
FIG. 6A depicts a schematic drawing of a top view of switching region 128.

FIG. 6A depicts a schematic drawing of a top view of switching region 128. Switching region 128 includes waveguide crossing 102, shunt waveguide 104, and directional couplers 126.

FIG. 6B depicts a scanning electron micrograph of switching region 128.

In the illustrative embodiment, bus waveguides 118 include tapers 602 on either side of directional couplers 126-1 and 126-2 where slab 308 is narrowed over a length suitable for enabling the bus waveguides to transition from a ridge-waveguide structure to a rib-waveguide structure with low optical loss. The height of the rib waveguide, therefore, is equal to the full thickness, t1, of active layer 304 (i.e., 220 nm), and the rib waveguide has a width of 350 nm. This exploits the fact that ridge waveguides typically have lower propagation loss than rib waveguides, while rib waveguides enable better optical coupling.

Shunt waveguide 104 is disposed at cantilever end 610 of actuator 106. As depicted in FIG. 6B, shunt waveguide 104 has a ridge-waveguide structure in the region between ends 122. In some embodiments, shunt waveguide 104 has a rib-waveguide structure along its entire length.

It should be noted that directional couplers 126 are rib-waveguide-based directional couplers having coupling length, L3, wherein each of end 122 and waveguide portion 124 is formed during operations 202 and 203 as having rib-waveguide structures. Coupling length, L3, is typically based on a number of factors, including waveguide width and the wavelength of light signal 110. Typically, L3 is selected such that directional coupler 126 is optimized for a single wavelength, or narrow band of wavelengths.

Cantilever 604 is a substantially rectangular beam that extends from anchor 608 in the x-y plane.

At optional operation 204, circuit elements, such as transistors, resistors, capacitors, control circuits, and the like, are formed on substrate 300. These circuit elements are typically formed in and on one or both of handle substrate 108 and active layer 304.

At operation 205, electrode 606 is formed on cantilever 604.

Electrode 606 is a layer of gold disposed on a thin layer of chrome, which enhances the adhesion of electrode 606 to the silicon of cantilever 604. The materials of electrode 606 are selected such that they are both electrically conductive and characterized by a significant residual tensile stress. In some embodiments, electrode 606 comprises one or more materials other than chrome and gold, such as platinum, tungsten, silver, aluminum, titanium nitride, and the like. Electrode 606 is disposed on anchor 608, as well as a portion of cantilever 604. By forming electrode 606 such that it extends onto the mechanically active region of cantilever 604, the residual stress of the electrode material induces an upward deflection of cantilever end 610 when actuator 106 is in its quiescent state. In some embodiments, during operation 205, additional electrical traces are formed on substrate 300 to electrically interconnect one or more circuit elements and/or electrode 606.

At operation 206, cantilever 604 and waveguide portions 124 are released from substrate 108 via a conventional sacrificial release etch. In operation 206, BOX layer 302 is etched from underneath the structure material of these elements defined during the patterning of active layer 304 during operation 202.

FIGS. 6C-D depict schematic drawing of cross-sectional views of actuator 106, before and after their release from substrate 108, respectively. The cross-sectional views of actuator 106 are taken through line a-a shown in FIG. 6A. Actuator 106 includes cantilever 604, electrode 606, and anchor 608. FIG. 6D depicts actuator 106 in its quiescent state.

Structural member 612 is a region of active layer 304 formed during operation 202. Portion 614 of structure member 612 defines a nascent cantilever region, while portion 616 of structure member 612 and portion 618 of BOX layer 308 collectively define a nascent anchor region, as depicted in FIG. 6C.

Once released from substrate 108 in operation 206, cantilever 604 and shunt waveguide 104 are fully formed and movable relative to substrate 108 as depicted in FIG. 6D. The sacrificial release etch used to release the cantilever and shunt waveguide is typically timed to leave BOX layer 302 the region of anchor 608 so that the anchor is substantially immovable with respect to substrate 108.

During operation 204, the BOX-layer material under waveguide portions 124-1 and 124-1 is also removed. As a result, both end 122 and waveguide portion 124 are suspended above substrate 108. Although it is not necessary to suspend waveguide portion 124, such a configuration serves to enhance the optical coupling between end 122 and waveguide portion 124 when the directional coupler is in its "on" state. In some embodiments, waveguide portions 124-1 and 124-1 are not suspended above the substrate.

FIGS. 7A and 7B depict schematic drawings of a cross-sectional view of directional coupler 126-2 when actuator 106 is in its quiescent and actuated states, respectively. The cross-sectional views of directional coupler 126-2 are taken through line b-b shown in FIG. 6A. It should be noted that the depictions of directional coupler 126-2 shown in FIGS. 7A-B are also representative of directional coupler 126-1.

When actuator 106 is in its quiescent state, end 122-2 and waveguide portion 124-2 are separated by quiescent distance d1 and directional coupler 126-2 is in its "off" state. A typical value for quiescent distance d1 is approximately 1 micron; however, any value of d1 that substantially precludes optical coupling between shunt waveguide 104 and bus waveguides 118 is within the scope of the present invention.

Directional coupler 126-2 is switched from its "off" state to its "on" state by the application of a voltage between electrode 606 and substrate 108. The applied voltage gives rise to an electrostatic force that drives cantilever 604 downward, thereby reducing the separation between end 122-2 and waveguide portion 124-2 to coupling distance d2. A typical value for coupling distance d2 is approximately 250 nanometers (nm). One skilled in the art will recognize, however, that other suitable values of d2 are within the scope of the present invention. As discussed above and with respect to FIG. 1B, coupling distance d2 is selected such that it enables substantially complete transfer of the optical energy of light signal 110 between end 122 and waveguide portion 124.

FIG. 8 depicts a plot of measured switching performance for a switching cell in accordance with the illustrative embodiment. Plot 800 shows the normalized transmission received at each of first output 114 (trace 802) and second output 116 (trace 804) as a function of the drive voltage applied to actuator 106.

Plot 800 shows that light signal 110 begins to appear at second output 116 as the drive voltage exceeds approximately 15 V. Optimum coupling occurs at a drive voltage of approximately 17V. The insertion loss, indicated by the maximum transmission at second output 116, is approximately 1.5 dB, while optical crosstalk (i.e., light leaked to first output port 114) is −20 dB.

As discussed above and with respect to FIG. 6A, typically, coupling length, L3, of directional couplers 126 is selected to optimize the performance of the directional coupler for a single wavelength, or narrow band of wavelengths. As disclosed by H. Yun, et al., in "2×2 Adiabatic 3-dB Coupler on Silicon-on-Insulator Rib Waveguides," *Proc. SPIE Photonics North* 2013, 89150V (2013), an adiabatic 3-dB directional coupler can be formed using fixed-position silicon-photonics rib waveguides, where the directional coupler has more uniform behavior across a broad wavelength range than a conventional directional coupler.

In some embodiments, therefore, switching cell 100 includes adiabatic directional couplers for optically coupling a shunt waveguide and bus waveguides 118, wherein the shunt waveguide is formed in a silicon-based layer disposed above the bus waveguides. The use of adiabatic directional couplers affords such embodiments with advantages, including:

i. coupling distance d1 can be defined by a mechanical standoff whose height can be precisely controlled during fabrication of the switching cell; or
ii. enabling the use of wider waveguides, which can have lower optical loss yet still enable good coupling between the waveguides; or
iii. wavelength independent directional coupler performance; or
iv. improved tolerance to manufacturing variation; or
v. a smaller footprint by virtue of fabrication of switching cell elements in different layers; or
vi. any combination of i, ii, iii, iv, and v.

FIGS. 9A and 9B depict schematic drawings of a simplified perspective view of switching region 900 in its unswitched and switched states, respectively, in accordance with a first alternative embodiment of the present invention. Switching region 900 is analogous to switching region 128 and includes bus waveguides 118, shunt waveguide 902, and directional couplers 906-1 and 906-2.

Shunt waveguide includes ends 904-1 and 904-2, which in combination with waveguide portions 124-1 and 124-2, respectively, define directional couplers 906-1 and 906-2. As discussed below, shunt waveguide 902 is a polysilicon-based, silicon-photonics waveguide having a ridge-waveguide structure. In contrast to ends 122, ends 904-1 and 904-2 have a width that is tapered along taper length L4, which enables adiabatic optical coupling between each end and its respective waveguide portion.

Figure 10A:
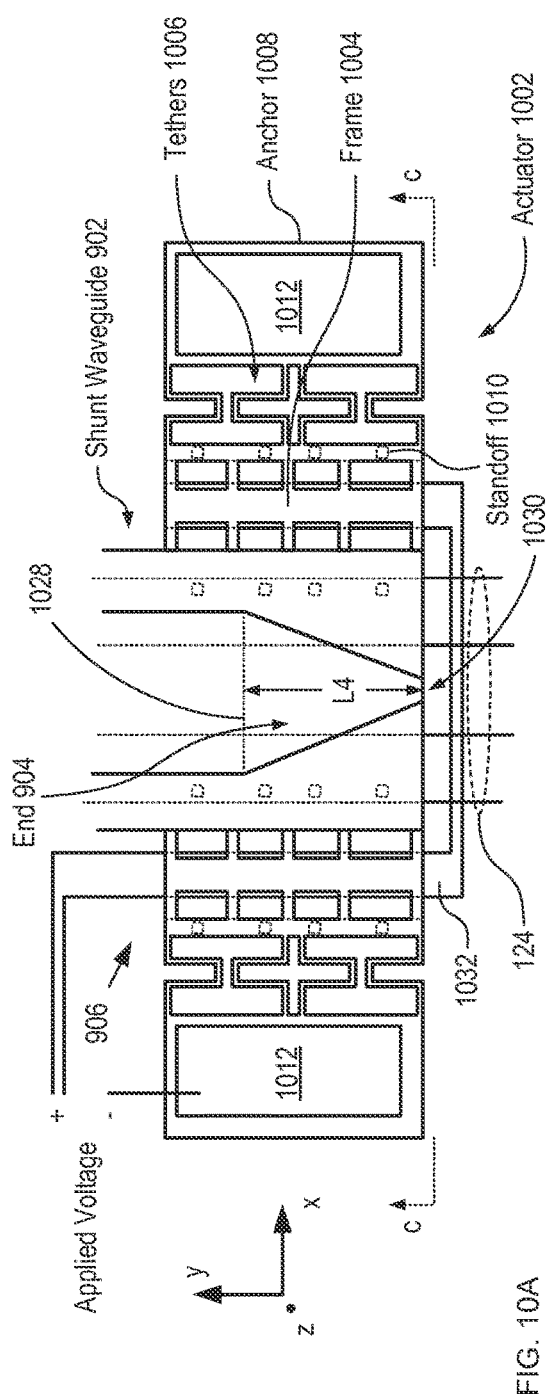
FIGS. 10A-B depict a schematic drawing of detailed top and cross-sectional views of an adiabatic coupler and associated actuator in accordance with the first alternative embodiment.
Figure 10B:
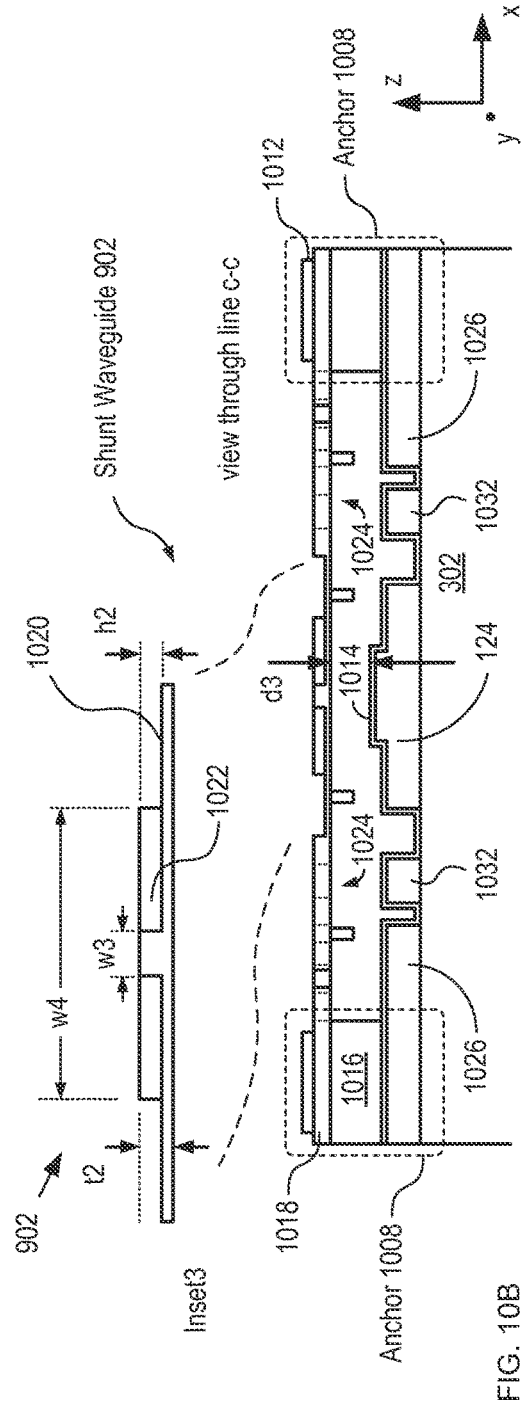

FIGS. 10A-B depict a schematic drawing of detailed top and cross-sectional views of an adiabatic coupler and associated actuator in accordance with the first alternative embodiment. Directional coupler 906 is representative of each of directional couplers 906-1 and 906-2. Directional coupler 906 includes waveguide portion 124 and end 904. End 904 is mechanically connected to actuator 1002, which is operative for moving end 904 vertically, such that the end is brought into and out of its optically coupled state with waveguide portion 124. FIG. 10B shows a cross-sectional view of directional coupler 906 taken through line c-c shown in FIG. 10A, while Inset 3 shows an enlarged cross-sectional view of end 904. In some embodiments, actuator 1002 is a lateral actuator, such as an electrostatic comb-drive actuator, that moves end 904 laterally to put it in or out of a coupled state with waveguide portion 124.

Figure 11:
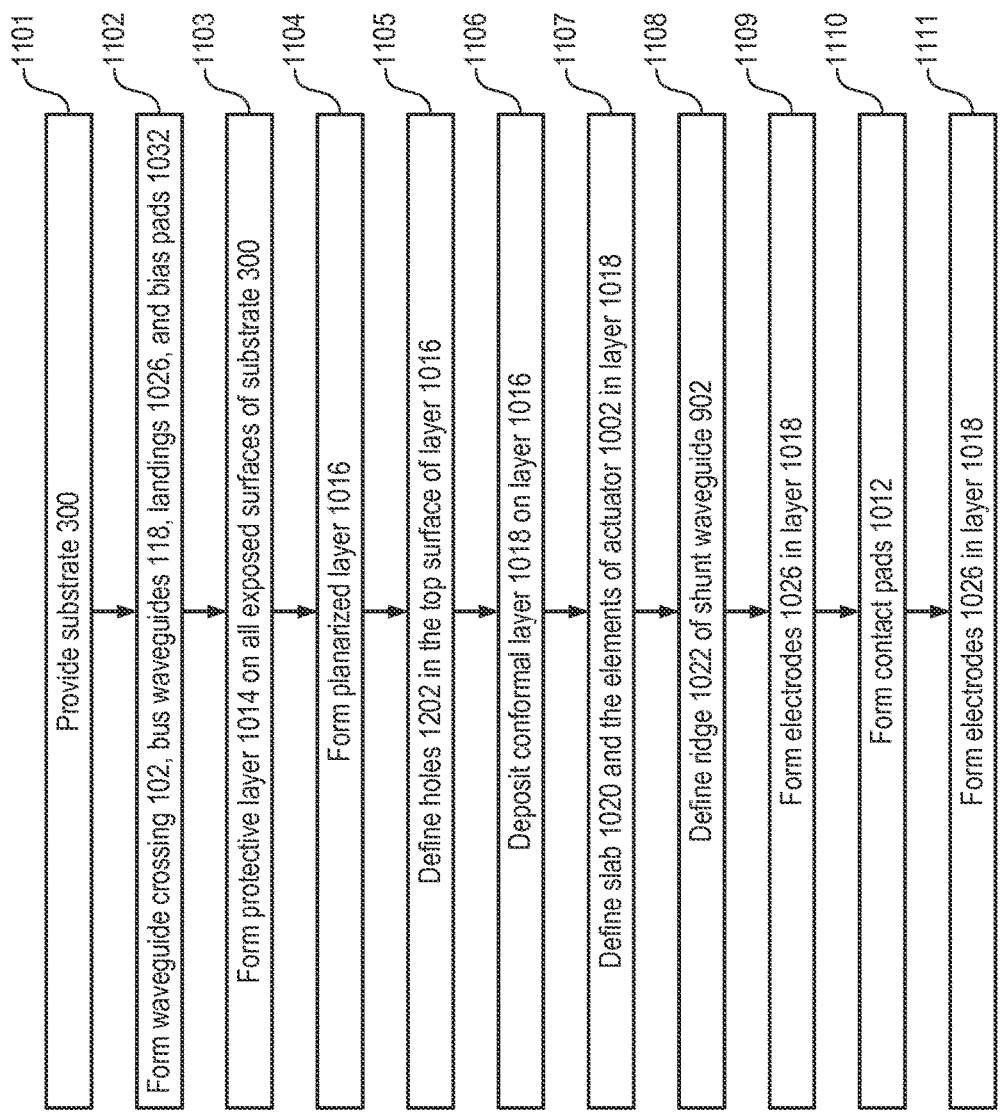
FIG. 11 depicts operations of a method suitable for forming a switching cell in accordance with the first alternative embodiment of the present invention.

FIG. 11 depicts operations of a method suitable for forming a switching cell in accordance with the first alternative embodiment of the present invention. Method 1100 begins with operation 1101, wherein substrate 300 is provided, as described above and with respect to operation 201.

FIGS. 12A-D depict schematic drawings of cross-sectional views of directional coupler 906 at different points in its fabrication.

At operation 1102, waveguide crossing 102, bus waveguides 118, landings 1026 and bias pads 1032 are formed in active layer 304. Operation 1102 is analogous to the combined operations 202 and 203, described above.

At operation 1103, layer 1014 is formed to protect the exposed regions of BOX layer 302 (exposed by the patterning of active layer 304) during a subsequent sacrificial release etch. Layer 1014 is a thin layer of aluminum oxide that is typically deposited on all exposed surfaces via atomic-layer deposition. The thickness of layer 1014 is kept sufficiently thin that it does not significantly affect the optical performance of directional coupler 906.

FIG. 12A shows directional coupler 906 after formation of a protective layer 1014.

At operation 1104, layer 1016 is formed and planarized. Layer 1016 is a conventional low temperature oxide (LTO) layer having a thickness of approximately 1.5 microns. After its formation, layer 1016 is planarized to a thickness of approximately 1.25 in a conventional planarization process, such as chemical-mechanical polishing (CMP). The final thickness of layer 1016 determines quiescent distance, d3, (typically ≥1 micron) when directional coupler 906 is in its "off" state. In some embodiments, layer 1016 is deposited such that it has a thickness other than 1.25 microns.

At operation 1105, a plurality of blind holes is formed in top surface of layer 1016. The plurality of holes are etched partially through the thickness of layer 1016 to a depth that is based on the desired thickness, h3, of standoffs 1010.

FIG. 12B shows directional coupler 906 after formation of holes 1202. As discussed below, the depth of holes 1202 determines coupling distance, d4, when directional coupler 906 is in its "on" state.

At operation 1106, layer 1018 is conformally deposited on layer 1016. Layer 1018 is a layer of polysilicon having a thickness, t2, of approximately 300 nm. Layer 1018 is deposited via a conventional deposition process, such as low-temperature chemical vapor deposition (LPCVD). Since layer 1018 conforms to layer 1016, holes 1202 are filled with polysilicon in operation 1106, thereby forming standoffs 1010.

In some embodiments, layer 1018 comprises a material other than polysilicon, such as silicon nitride, amorphous silicon, a different dielectric material, and the like.

In some embodiments, layer 1018 is a layer of single-crystal silicon that is joined to layer 1016 via a conventional wafer-bonding technique, such as thermo-anodic bonding, plasma-assisted wafer bonding, and the like. In some of these embodiments, holes 1202 are filled with a structural material, such as polysilicon, metal, dielectrics, etc., prior to joining the single-crystal silicon layer. It should be noted, however, that the structural material is preferably selected such that it can bond with the single-crystal silicon in the same wafer-bonding process.

FIG. 12C shows directional coupler 906 after formation of conformal layer 1018. The filling of holes 1202 with the material of layer 1018 forms standoffs 1010, which have height h3.

At operation 1107, slab portion 1020 of shunt waveguide 902 and the elements of actuator 1002 are defined, as described above and with respect to operation 203 of method 200.

Actuator 1002 includes frame 1004 and tethers 1006. Frame 1004 is a substantially rigid frame that provides support for shunt waveguide 902. Tethers 1006 are spring-like members having flexibility in the z-direction once they are released from substrate 108. Tethers 1006 are operative for supporting frame 1004 and shunt waveguide 902 above waveguide portion 124, while allowing for the frame and shunt waveguide to move toward the waveguide portion when actuator 1002 is actuated.

At operation 1108, ridge 1022 is defined in shunt waveguide 902. Ridge 1022 is defined etching partly through the thickness of layer 1018 to depth, h2, which is equal to 200 nm.

At the completion of operation 1108, shunt waveguide 902 is fully defined as a ridge waveguide having ends 904-1 and 904-2, where the ridge structure has a slab thickness of approximately 100 nm and a slab width of several microns, and a ridge height, h2, of 300 nm. Between ends 904, shunt waveguide 902 has ridge width, w4, while at each end 904, the width of the ridge tapers over length L4 from w4 at base 1028 to w3 at tip 1030, where w4 is 1 micron, w3 is 150 nm, and L4 is 30 microns. One skilled in the art will recognize that the values provided for the dimensions of shunt waveguide 902 are merely exemplary and that other suitable dimensions are within the scope of the present invention.

At operation 1109, electrodes 1024 are formed in regions of frame 1004, tethers 1006, and anchor 1008 by ion implantation of a suitable dopant, such as boron, into layer 1018. In some embodiments, the electrodes are formed via another doping method.

At operation 1110, contact pads 1012 are formed on anchors 1008 to enable electrical connection to electrodes 1024.

At operation 1111, shunt waveguide 902 and actuator 1002 are released by removing layer 1016 from under the shunt waveguide, as well as frames 1004 and tethers 1006, in a conventional sacrificial release etch. The release etch is timed such that layer 1016 remains in the regions of anchors 1008, as shown in FIG. 10B.

FIG. 12D shows fully formed directional coupler 906 in its "on" state. Directional coupler 906 is put in its "on" state by application of a voltage between electrodes 1024 and bias pads 1032. The applied voltage gives rise to an electrostatic force on frame 1004, which pulls the frame downward until standoffs 1010 make contact with landings 1026 and slab 308.

Standoffs 1010 project from the bottom surface of layer 1018. Their height, h3, is equal to the sum of the desired coupling distance, d4, and height, h2, of ridge 1022. As a result, when they contact landings 1026, they act as a mechanical stop that sets the separation between the bottom surface of shunt waveguide 902 and the top surface of bus waveguide 118 as the desired coupling distance, d4. As a result, embodiments of the present invention that include standoffs, such as standoffs 1010, can be operated in a digital mode with highly repeatable optical coupling losses.

It should be noted that the use of standoffs to determine coupling distance, d4, offers embodiments of the present invention an advantage because their height can be precisely controlled by the fabrication process. In some embodiments, coupling distance, d4, is determined by the thickness of a sacrificial material (e.g., LTO layer 1016) formed between the two layers of waveguides. Since the thickness of a deposited layer can typically be controlled more precisely than a lateral dimensional formed by the lithographic patterning and etching, this enables good control over d4.

It should be noted that method 1100 represents only one possible fabrication process for forming a switching element in accordance with the first alternative embodiment within the scope of the present invention.

Figures 13, 14:
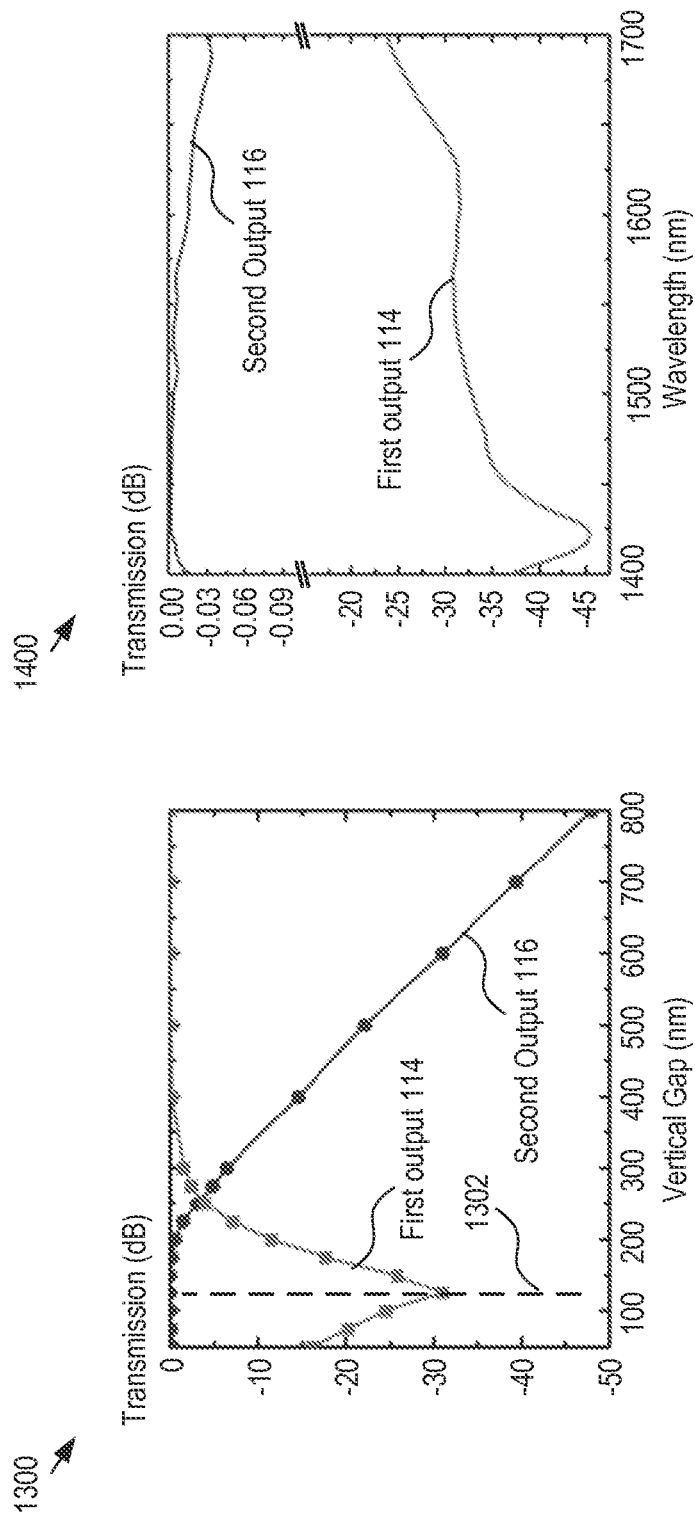
FIG. 13 depicts the simulated transfer characteristic of directional coupler 906 as a function of the spacing between shunt waveguide 902 and waveguide portion 124.
FIG. 14 depicts the simulated spectral response of directional coupler 906.

FIG. 13 depicts the simulated transfer characteristic of directional coupler 906 as a function of the spacing between shunt waveguide 902 and waveguide portion 124. Line 1302 denotes the spacing at which substantially optimal coupling between the waveguides is obtained. Plot 1300 shows that this occurs at a coupling distance, d4, equal to 125 nm.

FIG. 14 depicts the simulated spectral response of directional coupler 906. It can be determined form plot 1400 that insertion loss is quite low—approximately 0.01 dB. Further, directional coupler 906 exhibits residual transmission that is less than −20 dB over the entire 300 nm-wide spectral width.

FIG. 15 depicts a schematic drawing of a top view of a switching cell in accordance with a second alternative embodiment of the present invention. Switching cell 1500 includes shunt waveguide 902 and bus waveguides 118, each of which is curved away from the shunt waveguide to create a physical separation between the waveguides outside of the regions of directional couplers 906.

Typically, bus waveguides 118 are curved with a bending radius of approximately 100 microns, which both limits bending loss and keeps the overall size of the switching cell small; however, other bending radii are within the scope of the present invention. As light signal 110 propagates, it is effectively coupled between the bus waveguide and shunt waveguide 902 within a very short distance. In some embodiments, coupling loss at each directional coupler 906 is as low as 0.01 dB.

FIGS. 16A-B depict schematic drawings of perspective views of a switching region in accordance with a third alternative embodiment of the present invention. Switching region 1600 is analogous to switching region 900; however, it includes bus waveguides that are formed at different elevations above substrate 108. Further, shunt waveguide 902 couples with the bus waveguides by laterally moving into a position wherein it is vertically located between them. Switching region 1600 includes bus waveguides 1602-1 and 1602-2 and shunt waveguide 902.

Bus waveguides 1602-1 and 1602-2 (referred to, collectively, as bus waveguides 1602) are analogous to bus waveguides 118; however, bus waveguides are located at different heights above substrate 108. Bus waveguide 1602-1 is typically formed from the active layer of an SOI substrate, as described above. Shunt waveguide 902 and bus waveguide 1602-2 are formed using operations such as those described above and with respect to method 1100. The fabrication of bus waveguides 1602 on separate layers eliminates waveguide crossing 120, thereby enabling lower propagation loss through the switching region.

When each of directional couplers 1604-1 and 1604-2 (referred to, collectively, as directional couplers 1604) is in its "off" state, as shown in FIG. 16B, shunt waveguide 902 is laterally displaced and ends 904 are not optically coupled with the bus waveguides. As a result, light signal 110 stays in bus waveguide 1602-1 without any interruptions from crossing or transition and the only optical loss is the propagation loss of the waveguide. As discussed above, this loss can be made very low by properly designing the width of bus waveguides 1600.

When each of directional couplers 1604 is in their "off" state, as shown in FIG. 16B, shunt waveguide 902 is moved into the vertical space between the bus waveguides which optically couple with ends 904 as a result. Light signal 110, therefore, is shunted into shunt waveguide 902 at directional coupler 1604-1 and propagates to directional coupler 1604-2, where it couples out of the shunt waveguide and into bus waveguide 1602-2. Once switched, light stays in bus waveguide 1602-2 without any interruption and minimum optical loss can be realized.

2×2 Switching Cell

Figures 17A, 17B:
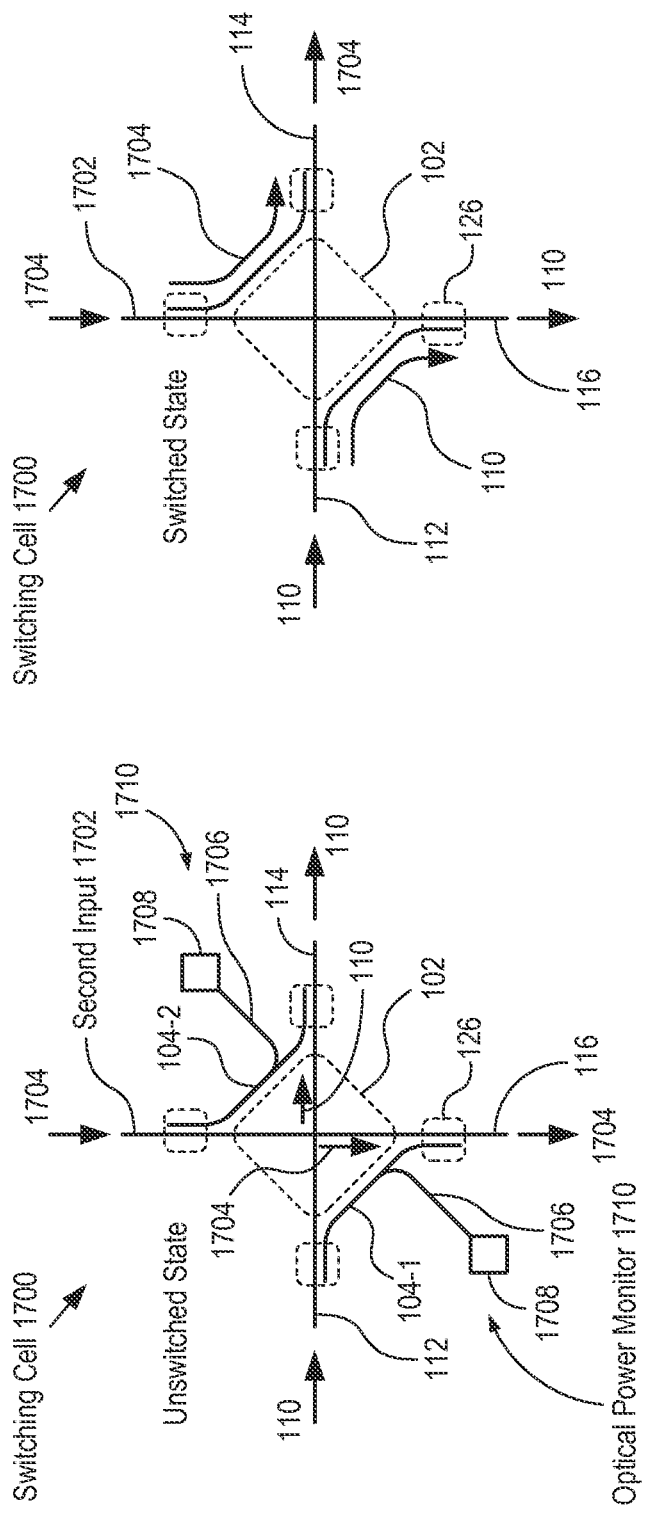
FIGS. 17A-B depict schematic drawings of top views of a 2×2 switching cell, in its unswitched and switched states, respectively, in accordance with the present invention.

FIGS. 17A-B depict schematic drawings of top views of a 2×2 switching cell, in its unswitched and switched states, respectively, in accordance with the present invention. Switching cell 1700 includes waveguide crossing 102, shunt waveguides 104-1 and 104-2, and actuators 106-1 and 106-2 (not shown for clarity), each of which is disposed on common substrate 108. Switching cell 1700 also includes optional optical power monitors 1710, each of which comprises waveguide tap 1706, and detector 1708. Optical power monitors 1710 are optically coupled with shunt waveguides 104-1 and 104-2 to provide a measure of the optical power coupled into the shunt waveguides. Switching cell 1700 operates in analogous manner to switching cell 100; however, switching cell 1700 includes two input ports and two shunt waveguides that enable a pair of light signals to be switched in cross-bar fashion.

As discussed above and with respect to FIGS. 1A-B, waveguide crossing 102 includes bus waveguides 118-1 and 118-2, which include input 112, first output 114, and second output 116. In switching cell 1700, waveguide crossing 102 also includes second input 1702, at which light signal 1704 is received.

In its unswitched state, each of shunt waveguides 104-1 and 104-2 is held well above bus waveguides 118. As a result, the shunt waveguides and bus waveguides are not optically coupled (i.e., directional couplers 126 are in their "off" states). In this state, switching cell 1700 enables light signal 110 to pass directly from input 112 to first output 114 while remaining in bus waveguide 118-1, while also enabling light signal 1704 to pass directly from input 1702 to second output 116 while remaining in bus waveguide 118-2. Typically, waveguide crossing 102 includes MMI region 402 to mitigate scattering losses, as discussed above.

In its switched state, actuators 106 move shunt waveguides 104-1 and 104-2 into an optically coupled relationship with bus waveguides 118, thereby putting directional couplers 126 into their "on" states. Shunt waveguide 104-1, therefore, couples the optical energy of light signal 110 out of bus waveguide 118-1 and couples it into bus waveguide 118-2, as discussed above. At the same time, shunt waveguide 104-2 couples the optical energy of light signal 1704 out of bus waveguide 118-2 and couples it into bus waveguide 118-1. As a result, light signal 110 is provided at second output 116, while light signal 1704 is provided at first output 114.

The amount of optical power in each of shunt waveguides 104-1 and 104-2 is detected via optional optical power monitors 1710, each of which includes a waveguide tap and a detector.

Waveguide taps 1706 are conventional optical taps (e.g., directional couplers, splitters, etc.) that direct a small fraction (typically 1-2%) of the optical energy of light signals 110 and 1704 to detectors 1708.

Detectors 1708 are conventional detectors and/or detector systems, such as photodetectors, channel monitors, and the like.

The inclusion of optical power monitors 1710 enables the position of shunt waveguides 104-1 and 104-2 to be monitored and controlled as a function of the amount of light coupled into the shunt waveguide. As a result, the amount of optical coupling between bus waveguides 118 and the shunt waveguides can be substantially optimized. In some embodiments (e.g., embodiments for broadcast and/or multicasting applications, as discussed below), the inclusion of optical power monitors 1710 enables equal portions of an incoming light signal to be directed to a plurality of output ports. For clarity, optical power monitors 1710 are not shown in FIG. 17B.

In some embodiments, each of shunt waveguides 104-1 and 104-2 are actuated independently, which enables light signals 110 and 1704 to be combined at the same output. Such an arrangement is of interest in applications such as wavelength add-drop systems, for example, where it can be desirable to provide more than one wavelength signal at the same output.

As discussed above, by combining multiple 1×2 and/or 2×2 switching cells, more complex network element embodiments, such as M×N cross-connects, data network cross-point switches, wavelength add-drop multiplexers, and the like, can be developed and such embodiments are within the scope of the present invention.

Optical Cross-Connect

Figure 18:
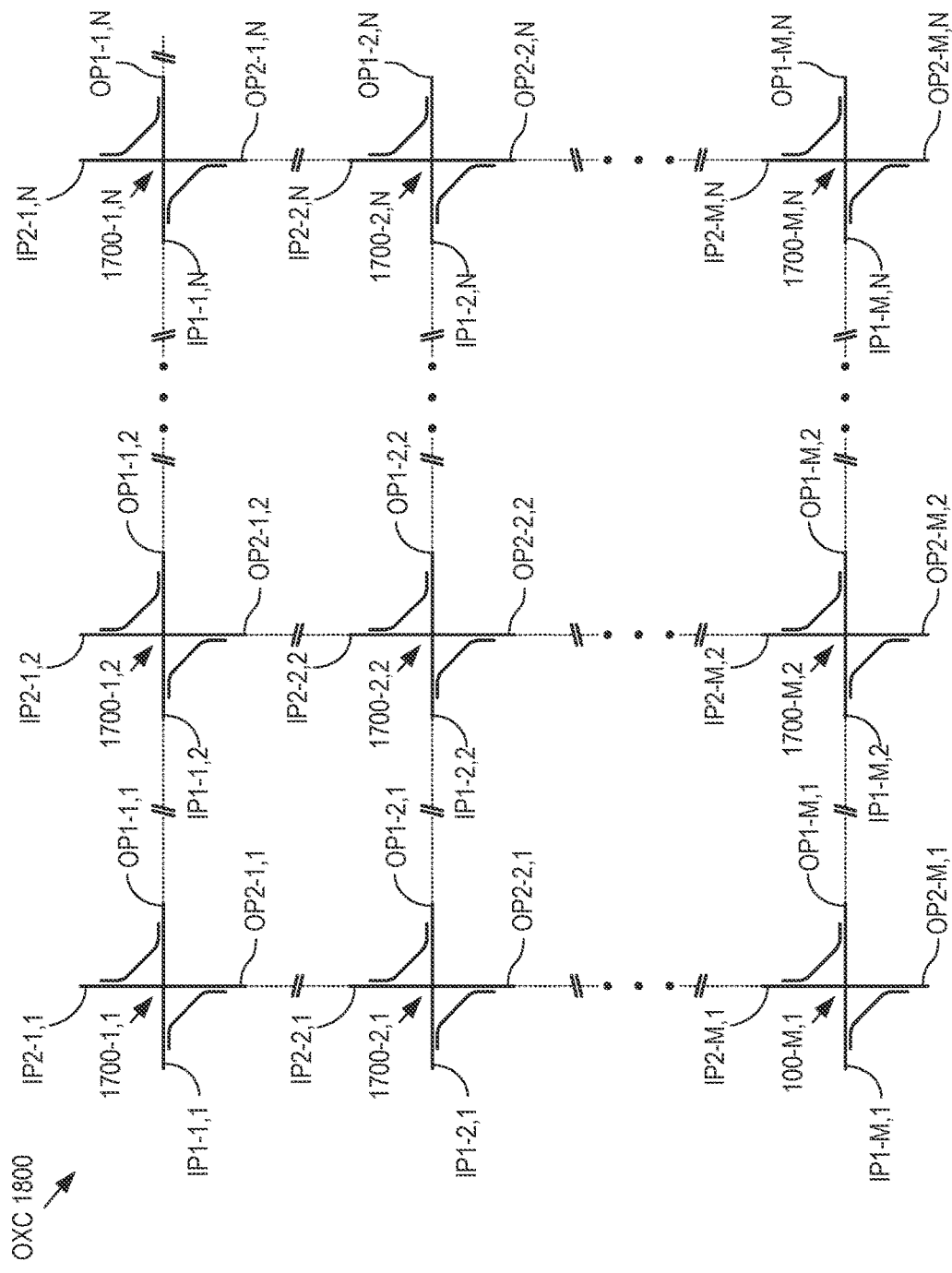
FIG. 18 shows a schematic drawing of a top view of an M×N optical cross-connect in accordance with the present invention.

FIG. 18 shows a schematic drawing of a top view of an M×N optical cross-connect in accordance with the present invention. Optical cross-connect 1800 includes a plurality of switching cells 1700, which is arranged in a two-dimensional arrangement having M rows and N columns. OXC 1800, therefore, includes M×N switching cells 1700, which collectively define a passive optical crossbar topology that consists of M×N intersecting bus waveguides 118. For clarity, in FIG. 18, the first input, second input, first output, and second output of switching cell 1700-i,j, are designated as IP1-i,j, IP2-i,j, OP1-i,j, and OP2-i,j, respectively.

Each switching cell 1700 is interconnected to its neighbors such that each of the first inputs and first outputs in each row are portions of the same bus-waveguide 118-1. In similar fashion, each of the second inputs and second outputs in each column are portions of the same bus waveguide 118-2. In other words, each first input IP1-i, j is optically connected to first output OP1-i,j-1, for j=2 through M, while each second input IP2-i,j is optically connected to second output OP2-i-1, j, for each i=2 through N.

The interconnectivity of switching cells 1700 enables switching paths through the network that have very low cumulative loss. Specifically, switching cell 1700 are interconnected such that:

i. for i=1 through M, each first input IP1-i,1 and each first output OP1-i,N can be interconnected via a path that includes two shunt waveguides (note that, for each row, i, the optical path between each IP1-i,1 and OP1-i,N includes only the bus waveguide 118-1 of that row and, therefore, includes no shunt waveguides);

ii. each first input IP1-i,1 and each second output OP1-i,N can be interconnected via a path that includes two shunt waveguides iii. for i=1 through M and j=1 through N, each first input IP1-i,1 and each second output OP2-M,j can be interconnected via a path that includes only one shunt waveguide;

iv. for j=1 through N, each second input IP2-1,j can be optically coupled with any second output OP2-M,j can be interconnected via a path that includes two shunt waveguides (note that, for each column, j, the optical path between each IP2-1,j and OP2-M,j includes only the bus waveguide 118-2 of that column and, therefore, includes no shunt waveguides); and v. for i=1 through M and j=1 through N, each second input IP2-1,j can be optically coupled with any first output OP1-i,N with a path that includes only one shunt waveguide.

As a result, no interconnection path between any input and any output of OXC 1800 requires coupling a light signal through more than two shunt waveguides. Further, this limit is independent of port count.

The largest number of waveguide crossings in an optical path is 2N−1. OXC 1800, therefore, is more scalable than prior-art OXC architectures.

Figure 19:
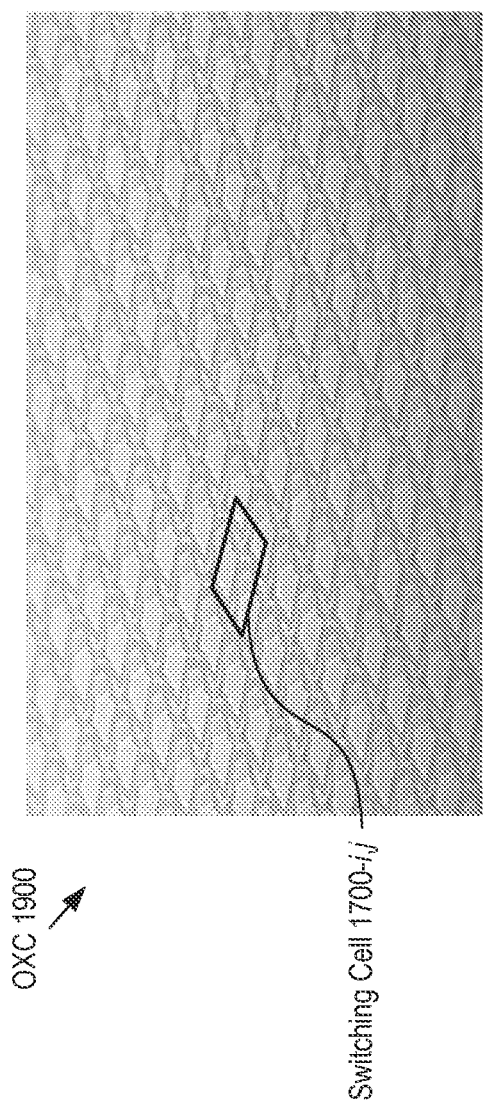
FIG. 19 shows a scanning electron micrograph of a portion of an OXC in accordance with the present invention.

FIG. 19 shows a scanning electron micrograph of a portion of an OXC in accordance with the present invention. OXC 1900 is a 50×50 OXC that is analogous to OXC 1800, wherein each switching cell is approximately 160×160 microns$^2$. The total real estate required for OXC 1900, therefore, is approximately 9 mm×9 mm. OXC 1900 has both low insertion loss and low path-dependent loss. The latter is only limited by the propagation loss along the bus waveguides and, in some embodiments of the present invention, is mitigated by employing a low-loss waveguide design for bus waveguides 118.

In some embodiments, waveguide taps and detectors are included on one or more of bus waveguides 118, input ports IP1 and IP2, and output ports OP1 and OP2.

In some embodiments, an architecture analogous to that of OXC 1900 is used to broadcast or multi-cast equal portions of an input light signal to a plurality of output ports. By appropriately controlling shunt waveguides 104-1 and 104-2 at each switching cell, an input light signal can be equally distributed to any of first output ports OP1-1,N through OP1-M,N, any of second output ports OP2-M,1 through OP2-M,N, or any combination thereof. For example, a light signal provided at IP1-2,1, can be multi-cast to each of OP2-M,1, OP2-M,2, and OP2-M,3 by controlling the positions of shunt waveguide 104-1 in each of switching cells 1700-M,1, 1700-M,2, and 1700-M,3 such that the optical energy of the light signal is equally distributed onto their respective bus waveguides 118-2. In some embodiments, optical power monitoring is provided at each of optical outputs OP1-i, N and OP2-M,j. In some embodiments, optical power monitoring is provided at points along bus waveguides 118-1 and 118-2.

Reconfigurable Optical Add-Drop Multiplexer

FIG. 20 depicts a schematic diagram of a reconfigurable wavelength add-drop multiplexer in accordance with the present invention. Reconfigurable wavelength add-drop multiples (ROADM) 2000 includes arrayed waveguide grating (AWG) 2002-1 and 2002-2 and switch array 2004.

Switch array includes a 3×3 array of switching cells 1700, which are arranged in a 3×3 array, as described above and with respect to FIG. 18.

In operation, WDM signal 2006 is received at conventional AWG 2002-1, which separates individual wavelength signals, λ1 through λ3, in the WDM signal and provides them to inputs In1 through In3 of switching cell 1700, respectively.

Switching cell 1700 are controlled to distribute the wavelength signals as desired. For example, FIG. 20 depicts switch array 2004 configured to pass λ1 through λ3 to outputs Out1 and Out3, respectively, while λ2 is dropped to drop port Drop3.

Outputs Out1 through Out3 are optically coupled with AWG 2002-2, which recombines these two wavelength signals into WDM signal 2008.

It should be noted that switching cell 1700 also includes a plurality of input ports, Add1 through Add3, which can be used to replace any dropped wavelength signals with a new light signal at the same wavelength.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An optical switching system disposed on a substrate that defines a first plane, the optical switching system comprising a first switching cell having a first arrangement of elements that includes:
   a first bus waveguide that is immovable with respect to the substrate, the first bus waveguide having a first input, IP1, and a first output, OP1;
   a second bus waveguide that is immovable with respect to the substrate, the second bus waveguide having a second output, OP2;
   a first shunt waveguide, the first shunt waveguide being movable with respect to the substrate in a first direction that is substantially orthogonal with the first plane; and
   at least one projection that is operative for establishing a separation between the first shunt waveguide and the first bus waveguide when the first shunt waveguide is in the second position;
   wherein, when the first shunt waveguide is in a first position; (1) the first shunt waveguide is optically decoupled from each of the first and second bus waveguides, and (2) IP1 is optically coupled with the OP1 and substantially optically decoupled from OP2; and
   wherein, when the first shunt waveguide is in a second position; (1) the first shunt waveguide is optically coupled with each of the first and second waveguides, and (2) IP1 is substantially optically decoupled from OP1 and optically coupled with OP2 through the first shunt waveguide.

2. The system of claim 1, wherein the second bus waveguide comprises a second input, IP2, and wherein the first arrangement further comprises:
   a second shunt waveguide that is movable with respect to the substrate;
   wherein, when the second shunt waveguide is in a third position; (1) the second shunt waveguide is optically decoupled from each of the first and second bus waveguides, and (2) IP2 is optically coupled with OP2 and substantially optically decoupled from OP1; and
   wherein, when the second shunt waveguide is in a fourth position; (1) the second shunt waveguide is optically coupled with each of the first and second waveguides, and (2) IP2 is substantially optically decoupled from OP2 and optically coupled with OP1 through the second shunt waveguide.

3. The system of claim 2, further comprising a plurality of switching cells, SC-i,j, where i=1 through M and j=1 through N, the plurality of switching cells including the first switching cell, and each of the plurality of switching cells including the first arrangement of elements, wherein the plurality of switching cells is arranged such that:
   for each of i=2 through M and j=2 through N;
      (1) IP1-i,j is optically coupled with OP1-i,j-1; and
      (2) IP2-i,j is optically coupled with OP2-i-1,j; and
   for each of i=1 through M and j=1 through N;
      (1) at least one path exists between IP1-i,1 and OP2-M,j that includes only one shunt waveguide; and
      (2) at least one path exists between IP2-1,j and OP1-i,N that includes only one shunt waveguide.

4. The system of claim 1, wherein the first arrangement of elements further comprises a first waveguide crossing that includes:
   a first waveguide portion, the first bus waveguide comprising the first waveguide portion, wherein the first bus waveguide has a first width outside the first waveguide crossing, and wherein the first waveguide portion has a second width that is larger than the first width; and
   a second waveguide portion, the second bus waveguide comprising the second waveguide portion, wherein the second bus waveguide has a third width outside the first waveguide crossing, and wherein the second waveguide portion has a fourth width that is larger than the third width;
   wherein the first waveguide portion and second waveguide portion intersect at a first crossing point; and
   wherein the second width enables multi-mode interference in a first light signal propagating through the first waveguide portion, and wherein the multi-mode interference focuses the optical energy of the first light signal near the center of the first waveguide portion at the first crossing point.

5. The system of claim 4, wherein the first waveguide portion and the second waveguide portion are orthogonal at the first crossing point.

6. The system of claim 1 wherein the first switching cell is operative in a digital mode having a first state in which the first shunt waveauide is in the first position and a second state in which the first shunt waveauide is in the second position.

7. The system of claim 1 wherein the first shunt waveauide includes the at least one projection.

8. The system of claim 1, wherein the first shunt waveguide has a first end and a second end, and wherein the first end and a portion of the first bus waveguide collectively define a first adiabatic directional coupler, and further wherein the second end and a portion of the second bus waveguide collectively define a second adiabatic directional coupler.

9. The system of claim 8, wherein the first end has a base having a first width and a tip having a second width that is smaller than the first width.

10. The system of claim 1, wherein the substrate defines a first plane, and wherein the first bus waveguide is in a second plane, the second bus waveguide is in third plane, and the first shunt waveguide is in a fourth plane that is between the second plane and third plane, and further wherein the first plane, second plane, third plane, and fourth plane are substantially parallel.

11. The system of claim 1, further comprising an optical power monitor, the optical power monitor being operative for monitoring an optical signal propagating through at least one of the first bus waveguide, the second bus waveguide, and the first shunt waveguide.

12. An optical switching system disposed on a substrate, the optical switching system comprising a first switching cell having a first arrangement of elements that includes:
   a first bus waveguide that is substantially immovable with respect to the substrate, the first bus waveguide having a first input, IP1, a first output, OP1, and a first waveguide portion that is between IP1 and OP1;
   a second bus waveguide that is substantially immovable with respect to the substrate, the second bus waveguide having a second input, IP2, a second output, OP2, and a second waveguide portion that is between IP2 and OP2;
   a first shunt waveguide that is movable with respect to the substrate between a first position and a second position, the first shunt waveguide having a first end and a second end;
   a first directional coupler that includes the first end and the first waveguide portion;
   a second directional coupler that includes the second end and the second waveguide portion; and
   at least one projection that is operative for establishing a separation between the first shunt waveguide and the first bus waveguide when the first shunt waveguide is in the second position;
   wherein, when the first shunt waveguide is in the first position, (1) each of the first directional coupler and second directional coupler is in an "off" state, and (2) IP1 is optically coupled with OP1 and not optically coupled with OP2;
   wherein, when the first shunt waveguide is in the second position, (1) each of the first directional coupler and second directional coupler is in an "on" state, and (2) IP1 is optically coupled with OP2 and not optically coupled with OP1; and
   wherein the first switching cell is operative in a digital mode in which the first shunt wavequide moves between the first position and the second position.

13. The system of claim 12, wherein each of the first and second directional coupler is an adiabatic directional coupler.

14. The system of claim 12, wherein each of the first end and second end has a base having a first width and a tip having a second width that is smaller than the first width.

15. The system of claim 12, wherein the substrate defines a first plane, and wherein the first shunt waveguide is movable in a first direction that is substantially orthogonal with the first plane.

16. The system of claim 15, wherein the first shunt waveguide includes the at least one projection.

17. The system of claim 12, wherein the substrate defines a first plane, and wherein the first shunt waveguide is movable in a first direction that is substantially parallel with the first plane.

18. The system of claim 12, wherein the first arrangement of elements further comprises a first waveguide crossing that includes:
   a third waveguide portion, the first bus waveguide comprising the third waveguide portion, wherein the first bus waveguide has a first width outside the waveguide crossing, and wherein the third waveguide portion has a second width that is larger than the first width; and
   a fourth waveguide portion, the second bus waveguide comprising the fourth waveguide portion, wherein the second bus waveguide has a third width outside the waveguide crossing, and wherein the fourth waveguide portion has a fourth width that is larger than the third width;
   wherein the third waveguide portion and fourth waveguide portion intersect at a first crossing point; and
   wherein the third width enables multi-mode interference in a first light signal propagating through the third waveguide portion, and wherein the multi-mode interference focuses the optical energy of the first light signal near the center of the third waveguide portion at the first crossing point.

19. The system of claim 18, wherein the first waveguide portion and the second waveguide portion are orthogonal at the first crossing point.

20. The system of claim 12, wherein the first arrangement of elements further comprises:
   a second shunt waveguide that is movable with respect to the substrate between a third position and a fourth position, the second shunt waveguide having a third end and a fourth end, wherein the third end and a second portion of the first bus waveguide collectively define a third directional coupler, and wherein the fourth end and a second portion of the second bus waveguide collectively define a fourth directional coupler;
   wherein, when the second shunt waveguide is in the third position, (1) each of the third directional coupler and fourth directional coupler is in an "off" state, and (2) IP2 is optically coupled with OP2 and not optically coupled with OP1; and
   wherein, when the second shunt waveguide is in the fourth position, (1) each of the third directional coupler and fourth directional coupler is in an "on" state, and (2) IP2 is optically coupled with OP1 and not optically coupled with OP2.

21. The system of claim 20, further comprising a plurality of switching cells, SC-i,j, where i=1 through M and j=1 through N, the plurality of switching cells including the first switching cell, and each of the plurality of switching cells including the first arrangement of elements, wherein the plurality of switching cells is arranged such that:
   for each of i=2 through M and j=2 through N;
      (1) IP1-i,j is optically coupled with OP1-i,j-1; and
      (2) IP2-i,j is optically coupled with OP2-i-1,j; and
   for each of i=1 through M and j=1 through N;
      (1) at least one path exists between IP1-i,1 and OP2-M,j that includes only one shunt waveguide; and
      (2) at least one path exists between IP2-1,j and OP1-i,N that includes only one shunt waveguide.

22. The system of claim 21, wherein the plurality of switching cells is arranged such that:

for each of i=1 through M, at least one path exists between each first input IP1-i,1 and each first output OP1-i,N that includes no more than one first shunt waveguide and one second shunt waveguide; and for each of j=1 through N, (1) at least one path exists between each second input IP2-1,j and each second output OP2-M,j that includes no more than one first shunt waveguide and one second shunt waveguide.

23. A method for switching an optical signal, the method comprising:
  (1) providing a first switching cell disposed on a substrate that defines a first plane, the first switching cell including a first arrangement of elements comprising;
    (a) first and second bus waveguides that are immovable with respect to the substrate, wherein the first bus waveguide has a first input, IP1, and a first output, OP1, and wherein the second bus waveguide has a second output, OP2;
    (b) a first shunt waveguide that is movable with respect to the substrate; and
    (c) at least one projection having a first height;
  (2) controlling the position of the first shunt waveguide between a first position in a second plane and a second position in a third plane, wherein the second and third planes are substantially parallel to the first plane, and wherein the second position is based on the first height;
  wherein, when the first shunt waveguide is in the first position, (1) the first shunt waveguide is not optically coupled with each of the first and second bus waveguides, (2) IP1 is optically coupled with OP1, and IP1 is not optically coupled with OP2; and
  wherein, when the first shunt waveguide is in the second position, (1) the first shunt waveguide is optically coupled with each of the first and second bus waveguides, (2) IP1 is optically coupled with OP2, and IP1 is not optically coupled with OP1.

24. The method of claim 23 wherein the first shunt waveauide is provided such that it includes the at least one projection.

25. The method of claim 24 wherein the position of the first shunt waveguide is controlled via a digital signal.

26. The method of claim 23, wherein the first switching cell is provided such that the first bus waveguide and second bus waveguide collectively define a waveguide crossing having a crossing point, and wherein the waveguide crossing is operative for inducing multi-mode interference in a first light signal propagating through the first bus waveguide such that the optical energy of the first light signal is focused near the center of the first bus waveguide at the crossing point.

27. The method of claim 26, wherein the waveguide crossing is further operative for inducing multi-mode interference in a second light signal propagating through the second bus waveguide such that the optical energy of the second light signal is focused near the center of the second bus waveguide at the crossing point.

28. The method of claim 23, wherein the first switching cell is provided such that the first arrangement of elements further comprises a second shunt waveguide that is movable with respect to the substrate and such that the second bus waveguide includes a second input, IP2, and wherein the method further comprises:
  (3) controlling the position of the second shunt waveguide between a third position and a fourth position;
  wherein, when the second shunt waveguide is in the third position, (1) the second shunt waveguide is not optically coupled with each of the first and second bus waveguides, (2) IP2 is optically coupled with OP2, and IP2 is not optically coupled with OP1; and
  wherein, when the second shunt waveguide is in the fourth position, (1) the second shunt waveguide is optically coupled with each of the first and second bus waveguides, (2) IP2 is optically coupled with OP1, and IP2 is not optically coupled with OP2.

29. The method of claim 28 further comprising:
  (3) providing a plurality of switching cells, SC-i,j, where i=1 through M and j=1through N, the plurality of switching cells including the first switching cell, and each of the plurality of switching cells including the first arrangement of elements, wherein the plurality of switching cells is arranged such that:
  for each of i=2 through M and j=2 through N;
    (1) IP1-i,j is optically coupled with OP1-i,j-1; and
    (2) IP2-i,j is optically coupled with OP2-i-1,j; and
  for each of i=1 through M and j=1 through N;
    (1) at least one path exists between IP1-i,1 and OP2-M,j that includes only one shunt waveguide; and
    (2) at least one path exists between IP2-1,j and OP1-i,N that includes only one shunt waveguide.

30. The method of claim 29, further comprising enabling portions of a first light signal to propagate from one of the first input, IP1-i,1 and the second input IP2-1,j to a plurality of outputs selected from the group consisting of OP1-M,j and OP2-i,N, wherein i=1 through M and j=1 through N.

31. The method of claim 29 wherein the plurality of switching cells and first switching cell are further arranged in the two-dimensional arrangement such that:
  (c) for each of i=1 through M, at least one path exists between each first input IP1-i,1 and each first output OP1-i,N that includes no more than one first shunt waveguide and one second shunt waveguide; and
  (d) for each of j=1 through N, (1) at least one path exists between each second input IP2-1,j and each second output OP2-M,j that includes no more than one first shunt waveguide and one second shunt waveguide.

* * * * *